US009208526B1

(12) United States Patent
Leise

(10) Patent No.: US 9,208,526 B1
(45) Date of Patent: Dec. 8, 2015

(54) METHOD AND SYSTEM FOR CATEGORIZING VEHICLE TREATMENT FACILITIES INTO TREATMENT COMPLEXITY LEVELS

(71) Applicant: STATE FARM MUTUAL AUTOMOBILE INSURANCE COMPANY, Bloomington, IL (US)

(72) Inventor: William J. Leise, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 14/627,139

(22) Filed: Feb. 20, 2015

Related U.S. Application Data

(60) Provisional application No. 62/023,711, filed on Jul. 11, 2014.

(51) Int. Cl.
| | | |
|---|---|---|
| *G06F 7/00* | (2006.01) | |
| *G06Q 40/08* | (2012.01) | |
| *G06Q 30/06* | (2012.01) | |
| *G06Q 10/00* | (2012.01) | |

(52) U.S. Cl.
CPC ............... *G06Q 40/08* (2013.01); *G06Q 10/20* (2013.01); *G06Q 30/0639* (2013.01)

(58) Field of Classification Search
CPC ... G06Q 40/08; G06Q 30/0283; G07C 5/008; G05D 1/00; G06F 7/00
USPC ............ 701/29.1, 31.4, 482; 345/667, 4, 26.1
See application file for complete search history.

(56) References Cited

U.S. PATENT DOCUMENTS

| | | | |
|---|---|---|---|
| 5,317,503 A | | 5/1994 | Inoue |
| 5,504,674 A | * | 4/1996 | Chen et al. ......................... 705/4 |
| 5,943,295 A | | 8/1999 | Varga et al. |
| 5,950,169 A | * | 9/1999 | Borghesi et al. .................. 705/4 |
| 6,225,891 B1 | | 5/2001 | Lyons et al. |
| 6,431,593 B1 | | 8/2002 | Cooper et al. |
| 6,438,475 B1 | | 8/2002 | Gioutsos et al. |
| 6,557,889 B2 | | 5/2003 | Breed |
| 6,644,688 B1 | | 11/2003 | Hu et al. |
| 7,324,951 B2 | * | 1/2008 | Renwick et al. ................... 705/4 |
| 7,636,676 B1 | * | 12/2009 | Wolery et al. ................ 705/26.4 |
| 8,311,856 B1 | | 11/2012 | Hanson et al. |
| 8,494,790 B2 | | 7/2013 | Zhu et al. |
| 8,510,196 B1 | * | 8/2013 | Brandmaier ........... G06Q 40/08 705/35 |
| 8,694,341 B1 | | 4/2014 | Hanson et al. |

(Continued)

OTHER PUBLICATIONS

U.S. Appl. No. 14/635,043, filed Mar. 2, 2015.

(Continued)

*Primary Examiner* — McDieunel Marc
(74) *Attorney, Agent, or Firm* — Marshall, Gerstein & Borun LLP; Randall G. Rueth

(57) ABSTRACT

To determine a vehicle treatment facility for treating a damaged vehicle after a crash, several treatment facilities within a predetermined distance of the damaged vehicle are categorized by treatment complexity level. Treatment facilities within the same treatment complexity level category as the damaged vehicle are ranked based on several treatment facility evaluation characteristics such as repair duration data, quality rating, availability, price schedule, location data, or a quality rating for one or more suppliers used by the treatment facility. A treatment facility is then selected for treating the damaged vehicle based on the rankings.

20 Claims, 10 Drawing Sheets

(56) References Cited

U.S. PATENT DOCUMENTS

| | | | |
|---|---|---|---|
| 8,712,893 B1* | 4/2014 | Brandmaier | G06Q 40/08 705/35 |
| 8,731,977 B1* | 5/2014 | Hardin et al. | 705/4 |
| 8,972,100 B2* | 3/2015 | Mullen et al. | 701/31.4 |
| 8,977,425 B1* | 3/2015 | Mullen et al. | 701/31.4 |
| 2002/0007225 A1 | 1/2002 | Costello et al. | |
| 2002/0007289 A1 | 1/2002 | Malin et al. | |
| 2002/0087488 A1 | 7/2002 | Fordahl et al. | |
| 2002/0103577 A1 | 8/2002 | Newport | |
| 2002/0103622 A1 | 8/2002 | Burge | |
| 2002/0185324 A1 | 12/2002 | Campbell et al. | |
| 2003/0015898 A1 | 1/2003 | Breed | |
| 2003/0046003 A1 | 3/2003 | Smith et al. | |
| 2003/0078798 A1 | 4/2003 | Zaks et al. | |
| 2004/0036261 A1 | 2/2004 | Breed | |
| 2004/0044549 A1 | 3/2004 | Loop | |
| 2004/0066188 A1 | 4/2004 | Goldfine et al. | |
| 2004/0117081 A1 | 6/2004 | Mori | |
| 2004/0153356 A1* | 8/2004 | Lockwood et al. | 705/9 |
| 2005/0049912 A1 | 3/2005 | Troyer et al. | |
| 2005/0125127 A1 | 6/2005 | Bomar et al. | |
| 2005/0131607 A1 | 6/2005 | Breed | |
| 2006/0081071 A1 | 4/2006 | Kessler et al. | |
| 2006/0129295 A1 | 6/2006 | Foo et al. | |
| 2006/0222207 A1 | 10/2006 | Balzer et al. | |
| 2006/0232052 A1 | 10/2006 | Breed | |
| 2006/0251293 A1 | 11/2006 | Piirainen et al. | |
| 2007/0075919 A1 | 4/2007 | Breed | |
| 2007/0198155 A1 | 8/2007 | Danisch | |
| 2007/0203777 A1 | 8/2007 | Berkey et al. | |
| 2007/0229248 A1 | 10/2007 | Mott et al. | |
| 2007/0294052 A1 | 12/2007 | Stathis et al. | |
| 2008/0082237 A1 | 4/2008 | Breed | |
| 2008/0109190 A1 | 5/2008 | Bauer et al. | |
| 2008/0243530 A1 | 10/2008 | Stubler | |
| 2008/0243556 A1* | 10/2008 | Hogan et al. | 705/4 |
| 2008/0255887 A1* | 10/2008 | Gruter | 705/4 |
| 2008/0306996 A1 | 12/2008 | McClellan et al. | |
| 2009/0001976 A1 | 1/2009 | Cech et al. | |
| 2009/0062978 A1* | 3/2009 | Picard | 701/29 |
| 2009/0189754 A1 | 7/2009 | Hochrein | |
| 2009/0319212 A1 | 12/2009 | Cech et al. | |
| 2009/0326989 A1 | 12/2009 | Schmitt et al. | |
| 2010/0138242 A1* | 6/2010 | Ferrick | G06Q 10/087 705/4 |
| 2010/0207754 A1 | 8/2010 | Shostak et al. | |
| 2010/0305977 A1 | 12/2010 | Hogan et al. | |
| 2011/0087505 A1* | 4/2011 | Terlep | 705/4 |
| 2011/0313936 A1* | 12/2011 | Sieger | 705/306 |
| 2012/0265563 A1* | 10/2012 | Kwasny | 705/5 |
| 2013/0218761 A1* | 8/2013 | Kwasny | 705/39 |
| 2014/0012748 A1 | 1/2014 | Knapp et al. | |
| 2014/0244075 A1 | 8/2014 | Litwinowicz et al. | |
| 2014/0277916 A1* | 9/2014 | Mullen et al. | 701/31.4 |
| 2014/0278571 A1 | 9/2014 | Mullen et al. | |
| 2014/0278572 A1* | 9/2014 | Mullen et al. | 705/4 |
| 2014/0309805 A1 | 10/2014 | Ricci | |
| 2014/0375446 A1 | 12/2014 | Wanami et al. | |
| 2015/0025917 A1 | 1/2015 | Stempora | |
| 2015/0039397 A1 | 2/2015 | Fuchs | |
| 2015/0039522 A1 | 2/2015 | Dillard et al. | |
| 2015/0149218 A1 | 5/2015 | Bayley et al. | |

OTHER PUBLICATIONS

U.S. Appl. No. 14/627,076, filed Feb. 20, 2015.
U.S. Appl. No. 14/627,092, filed Feb. 20, 2015.
U.S. Appl. No. 14/627,104, filed Feb. 20, 2015.
U.S. Appl. No. 14/627,145, filed Feb. 20, 2015.
U.S. Appl. No. 14/627,170, filed Feb. 20, 2015.
U.S. Appl. No. 29/518,133, filed Feb. 20, 2015.
Office Action issued in U.S. Appl. No. 14/627,092 dated Apr. 29, 2015.
Office Action issued in U.S. Appl. No. 14/627,145 dated May 6, 2015.
Office Action issued in U.S. Appl. No. 14/627,170 dated May 20, 2015.
Office Action issued in U.S. Appl. No. 14/627,076 dated Apr. 24, 2015.
Office Action issued in U.S. Appl. No. 14/627,076, dated Sep. 4, 2015.
Office Action issued in U.S. Appl. No. 14/627,092, dated Aug. 19, 2015.
Office Action issued in U.S. Appl. No. 14/627,145, dated Oct. 21, 2015.
Office Action issued in U.S. Appl. No. 14/627,170, Oct. 29, 2015.

* cited by examiner

METHOD AND SYSTEM FOR CATEGORIZING VEHICLE TREATMENT FACILITIES INTO TREATMENT COMPLEXITY LEVELS

RELATED APPLICATIONS

This application claims priority to and the benefit of the filing date of U.S. Provisional Patent Application No. 62/023,711 entitled "SYSTEM AND METHOD FOR AUTOMATED VEHICLE REPAIR TRIAGE," filed on Jul. 11, 2014, the entire contents of which is hereby expressly incorporated by reference. Additionally, this application is related to the following applications:

Co-pending U.S. patent application Ser. No. 14/627,076, entitled "METHOD AND SYSTEM OF GENERATING AND APPLYING REPAIR CODES TO ESTIMATE COST OF VEHICLE DAMAGE" and filed concurrently herewith;

Co-pending U.S. patent application Ser. No. 14/627,092, entitled "METHOD AND SYSTEM OF USING SPATIAL SENSORS ON VEHICLE FRAME TO DETERMINE CRASH INFORMATION" and filed concurrently herewith;

Co-pending U.S. patent application Ser. No. 14/627,104, entitled "METHOD AND SYSTEM FOR COMPARING AUTOMATICALLY DETERMINED CRASH INFORMATION TO HISTORICAL COLLISION DATA TO DETECT FRAUD" and filed concurrently herewith;

Co-pending U.S. patent application Ser. No. 14/627,145, entitled "METHOD AND SYSTEM FOR DISPLAYING AN INITIAL LOSS REPORT INCLUDING REPAIR INFORMATION" and filed concurrently herewith; and Co-pending U.S. patent application Ser. No. 14/627,170 entitled "METHOD AND SYSTEM FOR AUTOMATICALLY STREAMLINING THE VEHICLE CLAIMS PROCESS" and filed concurrently herewith, the entire disclosures of each of which are hereby expressly incorporated by reference.

TECHNICAL FIELD

The present disclosure generally relates to a system and a method for treating a vehicle damaged in a crash, and more particularly, to determining an appropriate treatment facility for treating the damaged vehicle.

BACKGROUND

Every year, vehicles are involved in collisions that result in varying amounts of damage to the vehicle. If the damaged vehicle is insured, an insurance claim is usually filed shortly after the collision. The damaged vehicle is typically brought to a location where an appraisal or assessment of the damage is made. Depending on the extent of the damage and the treatment facility where the damaged vehicle was brought, the damaged vehicle may then need to be further transported to a different treatment facility that is capable of performing the necessary repairs, or in the case where the damage is too costly to repair, to a salvage or a scrap facility. Additional costs are incurred when the damaged vehicle is brought to a first location for the initial appraisal and then to a subsequent location for the repair or salvage. By determining the extent of damage to the vehicle and the corresponding treatment shortly after a collision, the time and costs involved to currently process an insurance claim may be reduced.

SUMMARY

In accordance with a first example aspect of this invention, a method for categorizing vehicle treatment facilities into treatment complexity levels is provided. The method includes generating a plurality of treatment complexity levels, each of the plurality of treatment complexity levels representing a different degree of difficulty associated with treating damaged vehicles. The method further includes receiving a plurality of indications of treatment facilities, assigning each of the plurality of indications of treatment facilities to one of the plurality of treatment complexity levels, and sorting each of the plurality of indications of treatment facilities based on the assigned treatment complexity level. Moreover, the method includes storing the sorted indications of treatment facilities for selecting a treatment facility for treating a damaged vehicle.

In accordance with a second example aspect of this invention, a system for categorizing vehicle treatment facilities into treatment complexity levels includes a communication network and one or more computing devices communicatively coupled to the communication network, each of the one or more computing devices having a memory and one or more processors. At least one of the computing devices is configured to generate a plurality of treatment complexity levels, each of the plurality of treatment complexity levels representing a different degree of difficulty associated with treating damaged vehicles. Moreover, at least one of the computing devices is configured to receive a plurality of indications of treatment facilities, assign each of the plurality of indications of treatment facilities to one of the plurality of treatment complexity levels, sort each of the plurality of indications of treatment facilities based on the assigned treatment complexity level, and store the sorted indications of treatment facilities for selecting a treatment facility for treating a damaged vehicle.

BRIEF DESCRIPTION OF THE DRAWINGS

The figures described below depict various aspects of the systems and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

A vehicle treatment system utilizes crash information of a vehicle involved in a crash to approximate the extent of damage to the vehicle and determine a treatment facility for treating the damaged vehicle. The estimated vehicle damage is used to generate repair codes for repairing the vehicle and estimate the total cost of repair. Based on a determined treatment complexity level, the system identifies a treatment facility capable of treating the damaged vehicle and sends information for transporting the damaged vehicle to the treatment facility, thereby removing the need to initially bring the damaged vehicle to an interim location for a damage assessment before transporting the damaged vehicle to a designated treatment facility for treatment.

More specifically, the vehicle treatment system receives crash information in the form of acceleration, velocity, position of vehicle parts relative to the vehicle, and/or impact direction of the vehicle at the time of the crash. To estimate the extent of vehicle damage caused in the crash, the system analyzes one or more aspects of the crash information. In one example embodiment, the system calculates an estimate of the vehicle damage by comparing the crash information to collision data of a vehicle type that includes the damaged vehicle. The collision data may include various levels of vehicle damage associated with specified aspects of collision information. For example, one category of vehicle damage in the collision data may be equated to a particular vehicle acceleration or velocity, or a range of vehicle accelerations or velocities. Other categories of vehicle damage in the collision data may also be equated to a vehicle direction, which indicates where the damaged vehicle was likely impacted. Based on the extent of vehicle damage, the system also determines a treatment complexity level for treating the damaged vehicle. Thereafter, information related to treating the damaged vehicle is then transmitted by the system. The treatment information may be automatically sent to a treatment facility, a vehicle transporter, a person or entity such as the vehicle owner, or an associated insurance agent, for example. In particular, treatment facilities capable of treating vehicles having a particular treatment complexity level may be ranked according to one or more factors and the treatment information may be sent to one or more of the highest ranking facilities. As such, this system allows for vehicles damaged in a collision to be transported directly to a treatment facility capable of performing the desired treatment, e.g., repair, salvage, scrap; soon after the crash, thereby avoiding the time associated with bringing the damaged vehicle to an assessment center or having an adjuster visit the damaged vehicle to assess an insurance claim before the damaged vehicle is brought to a designated treatment facility.

Figure 1:
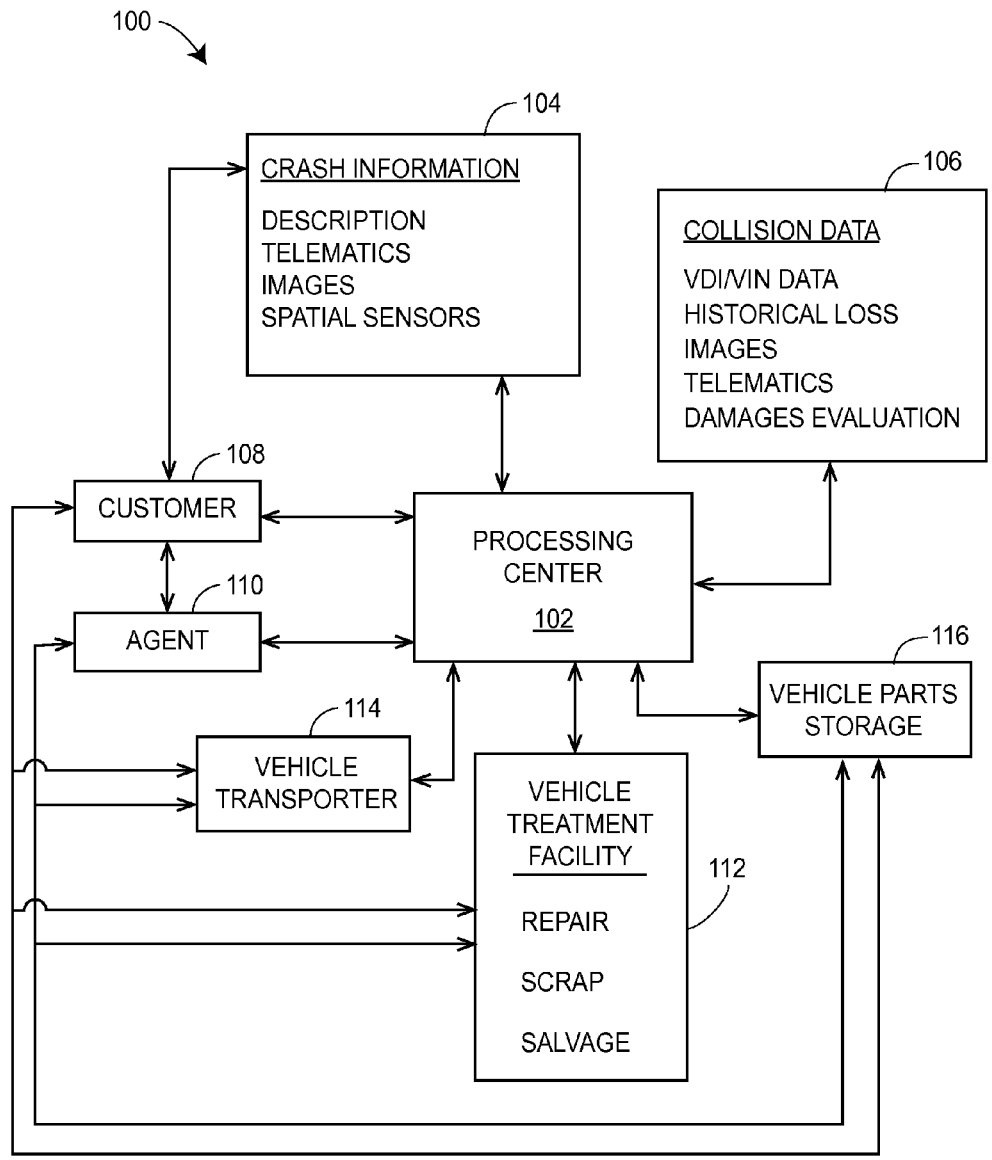
FIG. 1 is a general overview of a vehicle treatment system for treating a vehicle damaged in a crash.

FIG. 1 is a general overview of a system 100 for determining a treatment of a vehicle damaged in a crash. As used herein, the term "vehicle" refers to any type of powered transportation device, which includes, and is not limited to, an automobile, truck, bus, motorcycle, or boat. While the vehicle may normally be controlled by an operator, it is to be understood that the vehicle may be unmanned and remotely or autonomously operated in another fashion, such as using controls other than the steering wheel, gear shift, brake pedal, and accelerator pedal. The system 100 in FIG. 1 includes a processing center 102 capable of facilitating an analysis of the damaged vehicle's crash information 104. The analysis may include a comparison of the damaged vehicle's crash information 104 with collision data 106 to estimate the extent of vehicle damage and determine a treatment for the vehicle. Throughout this description, the term crash is used in reference to the particular incident in which the vehicle was damaged and the term collision is used in reference to one or more incidents in which another vehicle or vehicles were damaged. The analysis of the crash information 104 may be performed by system personnel and/or a computing device at the processing center 102.

The crash information 104 provided to the processing center 102 includes specific information related to the crash that damaged the vehicle and may include information received from the vehicle owner 108, driver, or occupant, an insurance agent 110 and/or entity of the damaged vehicle, an emergency responder, an accident investigator. The crash information 104 may include impact characteristics of the vehicle involved in the crash, which may be provided to system personnel and/or the processing center 102 by an observer of the damaged vehicle. For example, the driver of the damaged vehicle may provide crash information such as the approximate speed of the vehicle at the time of the crash and what area of the vehicle was damaged. Other observed crash information provided to system personnel and/or the processing center 102 may include whether the vehicle's airbags deployed or if the vehicle is drivable. In addition, images of the damaged vehicle may be used for comparison to images of vehicles of the same or similar type with known damage from other collisions. Some impact characteristics of the crash may be automatically relayed to system personnel and/or the processing center 102 by telematics devices, e.g., sensors, operatively coupled to the vehicle. The sensors enable a computing device to automatically attain impact characteristics such as vehicle acceleration, velocity, position of vehicle parts relative to the vehicle and/or direction at the time of the crash. For example, spatial sensors may be placed at different locations throughout the vehicle. Each spatial sensor may correspond to a vehicle part such as, for example, a front pillar or a portion thereof. A telematics device may communicate with the spatial sensor and determine the position of the sensor relative to the telematics device. In this manner, the telematics device can determine when the spatial sensor moves relative to the telematics device, and can infer that the front pillar has moved from its original position and is therefore damaged by the crash. Moreover, system personnel and/or the processing center 102 may be able to estimate the cost to repair or replace the vehicle part and the extent of the damage to the vehicle part based on the distance in which the spatial sensor moved. Additional crash information may include the damaged vehicle's identification number (VIN) and related data, which may have been made available to system personnel and/or the processing center 102 prior to the crash. The VIN data may include the make, model, year, and type of vehicle as well as previous damage/repair information and insurance claim information associated with the damaged vehicle. Additionally, or alternatively, the crash information may include a vehicle data identifier (VDI) for the damaged vehicle. A VDI may include a plurality of segments corresponding to vehicle attributes associated with an individual vehicle and/or a type, group, or classification of the vehicle. In some embodiments, a VIN may be one example of a VDI.

Collision data 106 generally includes records or compilations of information involving other vehicles damaged in other collisions, such as VIN data, historical loss information including historical injury data associated with the loss, images, telematics information, and vehicle damage evaluation. The collision data 106 may be periodically updated and any of the collision data utilized by system personnel and/or the processing center 102 may be stored in the system 100 and/or operatively coupled to the processing center.

The VIN data may include vehicle manufacturer information such as recommended repair procedures and costs, vehicle part warranties, costs and market value estimations of various vehicles and vehicle parts, etc. The VIN database may also include vehicle safety information including, and not limited to, vehicle part recall information, safety notices, repair notices, etc. Historical loss information may include observed or measured amounts of vehicle damage and the corresponding cost of repair associated with or resulting from known, observed, or measured aspects relating to a collision or impact of another vehicle, such as vehicle acceleration, velocity, position of vehicle parts relative to the vehicle, and/or direction. Some examples of historical loss data include vehicle crash test results, bumper test results, traffic accident investigations, and the like. Various impact characteristics such as vehicle acceleration, velocity, position of vehicle parts relative to the vehicle, direction, and/or image can be compiled into a chart or table and associated with known vehicle damage. A damage evaluation tool may include a guide or template to be used in estimating the extent of vehicle damage. For example, stored images and operating characteristics of vehicles damaged in other collisions may be used to compare with like images and operating characteristics of the vehicle damaged in the crash. In another example, stored collision data related to the movement of vehicle parts in other collisions may be used to compare with like movement for like vehicle parts damaged in the crash.

Additionally, treatment for the damaged vehicle can also be facilitated by comparing the crash information with the collision data. That is, the extent of vehicle damage resulting from the crash can be estimated by comparing impact aspects of the crash with similar impact aspects of similar vehicles involved in past collisions. The compilation of impact characteristics associated with known vehicle damage from similar vehicles involved in previous collisions can be used as a guide or template to estimate the amount of damage that occurred to the vehicle involved in the crash.

Once the extent of vehicle damage has been estimated, an estimate for treating the vehicle can be determined. In short, various levels of vehicle damage may be equated with various levels of vehicle treatment. That is, the estimated extent of vehicle damage can be equated to a treatment complexity level. For example, minor, medium, and major vehicle damage can be equated to minor, medium and major vehicle repair. Irreparable vehicle damage may be equated to a scrapping or salvaging treatment. More specifically, each damaged vehicle part may be assigned a repair code from a set of repair codes based on the extent of the damage to the vehicle part. The set of repair codes may include a separate repair code for each combination of vehicle characteristics such as make and model of the vehicle being repaired, the vehicle part being repaired, the type of repair for the vehicle part including whether the vehicle part needs to be repaired or replaced, the extent of the damage to the vehicle part, etc. Each repair code may correspond to a cost estimate. In this manner, the repair codes make up a standardized system for automatically determining the cost of vehicle treatment for any type of damage to any type of vehicle based on vehicle characteristics. For example, repair code 00123 may be for repairing the hood of a Honda Accord with slight damage. On the other hand repair code 00426 may be for replacing the bumper of a Nissan Altima with heavy damage. The associated cost estimate for repair code 00123 may be $100 whereas the associated cost estimate for repair code 00426 may be $500. Each assigned repair code may be aggregated and/or combined to determine a total cost estimate for the damaged vehicle. The repair codes are described in more detail below with reference to FIGS. 5B-5D.

Once the vehicle treatment complexity has been estimated, system personnel and/or the processing center 102 may identify a vehicle treatment facility 112 capable of performing the requisite treatment. In some embodiments, vehicle treatment facilities capable of performing the requisite treatment may be ranked according to one or more factors such as, for example, repair duration data for the treatment facility, a treatment facility quality rating, a treatment facility availability, a price schedule for treating damaged vehicles, treatment facility location data, a ranking for one or more suppliers used by the treatment facility, or any combination thereof. Each of the treatment facilities may receive a treatment score for each factor, and the factors may be aggregated and/or combined to determine an overall treatment score for each treatment facility. The treatment facilities may then be ranked based on their respective overall treatment scores, and system personnel and/or the processing center 102 may identify the highest ranking vehicle treatment facility as the vehicle treatment facility 112 for performing the requisite treatment. In other embodiments, the processing center 102 may identify a subset of the highest ranking treatment facilities, and a policyholder and/or owner of the damaged vehicle may select the vehicle treatment facility 112 from the subset of treatment facilities for performing the requisite treatment.

In any event, a vehicle transporter 114 may be contacted by system personnel and/or the processing center 102 to transport the damaged vehicle from the crash site to the identified treatment facility 112, e.g., a service repair center, a scrapping or salvaging facility. For irreparable vehicles, the damaged vehicle may be dismantled before scrapping and undamaged vehicle parts may be salvaged and stored at a warehouse 116 for reuse and resale.

Figure 2:
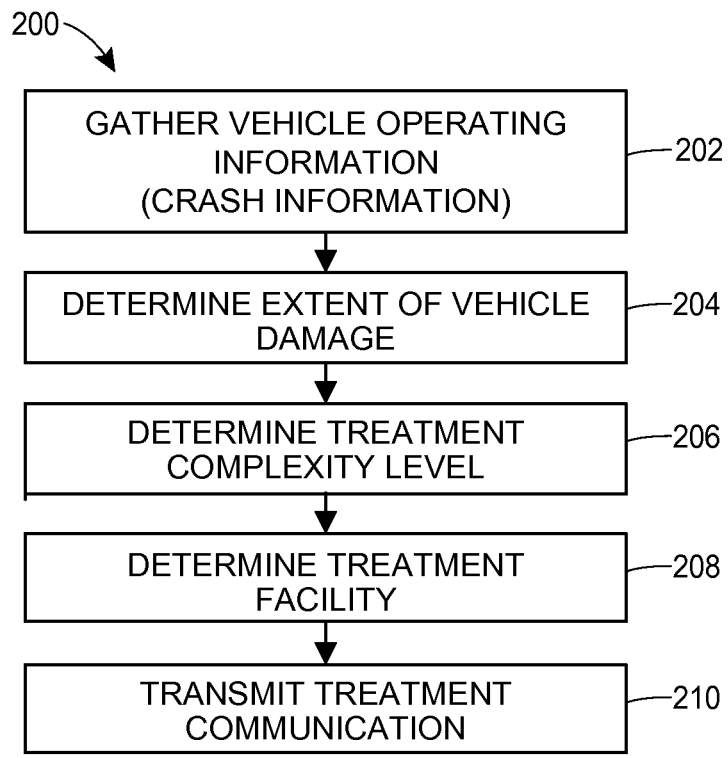
FIG. 2 depicts an example vehicle treatment process capable of being implemented in the vehicle treatment system illustrated in FIG. 1 in accordance with the presently described embodiments.

FIG. 2 is a flow diagram 200 depicting an example embodiment of a vehicle treatment process that may be implemented by the treatment system 100 shown in FIG. 1. More particularly, the method 200 may be executed separately or cooperatively by system personnel and the processing center 102. Vehicle crash information is gathered for analysis (block 202). The vehicle crash information may be provided to system personnel and/or the processing center 102 by a vehicle occupant or emergency responder communicating characteristics of the crash. The crash characteristics may include descriptions of the approximate speed the vehicle was moving at the time of the crash, where the vehicle was damaged, the type of damage to the vehicle, whether the vehicle can be operated and/or moved, if the vehicle's airbags or other safety systems were deployed as a result of the crash, etc.

Crash characteristics may also be provided to system personnel and/or the processing center 102 by the vehicle's engine control unit (ECU) and/or one or more telematics devices that are capable of monitoring and/or noting various vehicle functions, e.g., acceleration, velocity, position of vehicle parts relative to the vehicle, and/or direction of the vehicle at the time of the crash, sometimes referred to as event data recording (EDR). The telematics devices are operatively coupled to the vehicle and may be configured to automatically function when the vehicle is in operation. For example, the vehicle's operating information, e.g., acceleration, velocity, position of vehicle parts, and/or direction of the vehicle, may be periodically monitored when the vehicle is moving. When a crash occurs, the monitored speed, direction of the vehicle, and positions of various vehicle parts may be automatically attained and transmitted to system personnel and/or the processing center 102 as crash characteristics.

When the crash information is received by system personnel and/or the processing center 102, the crash information is analyzed to determine an estimate of the extent of damage caused to the vehicle during the crash (block 204). The analysis may include calculating the extent of damage by comparing the crash information 104 to collision data 106. Based on the estimated vehicle damage, a treatment complexity level is determined (block 206). The treatment complexity level is an estimate indicating the level of difficulty involved with treating the damaged vehicle. The treatment of the vehicle may include repairing or replacing damaged vehicle parts, and in some instances where repairing the vehicle is too costly, scrapping the vehicle. In some embodiments, the treatment complexity level may be determined separately for each individual part damaged in the crash. For example, the hood may require minor repairs whereas the fender may be damaged significantly and require heavy repairs or replacement. The treatment complexity level may also include a price schedule for treating the damaged vehicle, and/or a time duration for completing the treatment of the damaged vehicle. Once the estimated treatment complexity level is determined, one or more treatment facilities capable of performing the requisite treatment may be identified by system personnel and/or the processing center (block 208). System personnel and/or the processing center 102 may then transmit a communication related to the treatment of the damaged vehicle (block 210). For example, system personnel and/or the processing center 102 may contact one or more identified treatment facilities to initiate or inquire further in regard to the continued treatment of the damaged vehicle (block 210).

Figure 3:
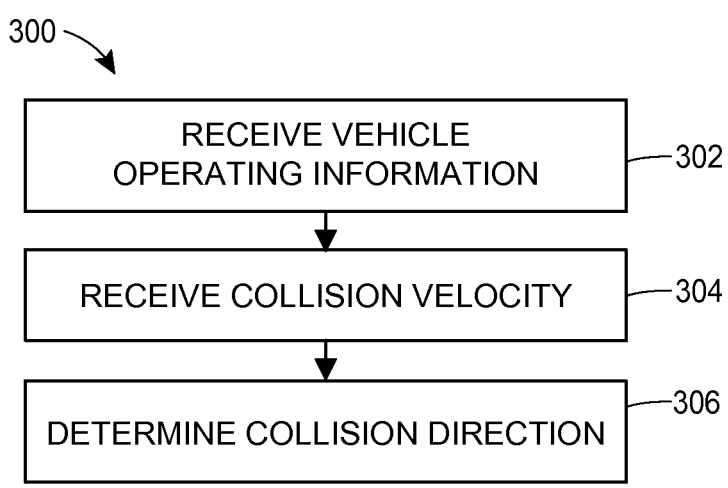
FIG. 3 depicts an example method for gathering or receiving crash information in accordance with the presently described embodiments.

A flow diagram 300 of an example embodiment for gathering vehicle crash information is depicted in FIG. 3. Crash information may be received by system personnel and/or the processing center 102 from an individual(s) present at the crash site, such as a vehicle occupant or an emergency responder (block 302). For example, the driver of the vehicle may contact system personnel and/or the processing center 102 and provide the approximate speed the vehicle was moving at the time of the crash (block 304), where the vehicle was damaged (block 306), descriptions and/or images of the damaged vehicle, whether the vehicle can be started and/or driven, if the vehicle's airbags or other safety systems were deployed as a result of the crash, the position of various vehicle parts in relation to the vehicle, etc. In addition, similar and/or additional crash information may be provided by the vehicle's EDR as well.

In treatment systems 100 where telematics devices are utilized, similar crash information may be automatically provided to system personnel and/or the processing center 102 by a computing device and/or telematics devices operatively coupled to the vehicle. In particular, while the vehicle is being operated, the vehicle's operating information may be monitored by a series of measurements of operating conditions or characteristics pertaining to the operation of the vehicle. For example, one or more computing devices such as a mobile computing device, an on-board computing device, and/or a server device may be communicatively coupled to sensors such as an accelerometer array operatively coupled to the vehicle. The accelerometer array may monitor and/or measure the acceleration of the vehicle along several axes and/or travelling directions. Measured operating information such as vehicle acceleration, velocity, and direction may be logged periodically (e.g., every millisecond, every second, etc.) or conditionally on the occurrence or detection of an event (e.g., a crash) and stored in the system 100, for example, as an event log (e.g., crash log) in a data storage unit of the system or a remote storage unit communicatively coupled to the system. The crash log may include a timestamp to note the time of the measurement. In one example configuration, system personnel and/or the processing center 102 may determine, derive, or deduce additional crash information. In particular, the vehicle acceleration at the time of the crash may be considered primary crash information, wherein additional, or secondary, crash information may include a crash velocity and/or a crash direction, which may be mathematically derived by system personnel and/or the processing center 102 from the acceleration monitored and/or measured via the accelerometer and computing device. More particularly, the system's 100 computing device(s) may monitor, via the accelerometer array, acceleration associated with the vehicle in the X, Y, and/or Z axes and create accelerometer logs. In some embodiments, the X-axis may be oriented along a front-back axis aligned with the vehicle and/or mobile and/or on-board computing device, the Y-axis may be oriented along a side-side axis aligned with the vehicle and/or mobile or on-board computing device, and the Z-axis may be oriented along a top-bottom axis aligned with the vehicle and/or mobile and/or on-board computing device. However, these axes may be positioned in other ways.

Detection of a vehicle crash may be facilitated by the use of the accelerometer. For example, a crash may be detected when a computing device operatively coupled to the accelerometer notes a significant, near immediate increase or decrease in the monitored acceleration in the fore-aft, lateral, and/or vertical direction of the vehicle, e.g., X, Y, and Z axes. Alternatively, a crash may be detected by a GPS unit via detection of a significant increase or decrease in vehicle velocity, or through near-simultaneous activation of an emergency response such as the deployment of an air-bag or an alert, e.g., automatic collision notification (ACN), etc.

In another example, one or more computing devices such as a mobile computing device, an on-board computing device, and/or a server device may be communicatively coupled to spatial sensors such as radio frequency identification (RFID) sensors, positioning beacons, etc., placed on several vehicle parts throughout the vehicle. The on-board computing device and/or mobile computing device may receive identification information from the spatial sensors and determine corresponding vehicle parts attached to the spatial sensors based on the identification. For example, the on-board computing device and/or mobile computing device may store a known original location or reference point and a corresponding vehicle part for each spatial sensor, which may be retrieved upon receiving identification information for the spatial sensor. Moreover, the on-board computing device and/or mobile computing device may use triangulation and/or trilateration to determine the location of the spatial sensors by measuring angles and/or distances from the spatial sensors to the known positions of RFID readers, wireless radios, etc., disposed within the on-board computing device and/or mobile computing device. The determined location for a spatial sensor may be compared to the known original location or reference point for the spatial sensor to determine whether the spatial sensor has moved as a result of the crash. Moreover, in some embodiments, the on-board computing device and/or mobile computing device may compare the measured distances to known original distances between the spatial sensors and the on-board computing device and/or mobile device to determine whether the spatial sensors have moved as a result of the crash.

In trilateration, the distances may be measured or approximated based on a received signal strength (RSS) of the RFID signal or positioning signal from one of the spatial sensors. The stronger the received signal, the closer the spatial sensor is to the on-board computing device and/or the mobile computing device. For example, based on the RSS, the on-board computing device may determine the spatial sensor is 3 meters from a first wireless radio disposed within the on-board computing device, 3.2 meters from a second wireless radio, and 3.4 meters from a third wireless radio. Then, for example, the on-board computing device may calculate the exact location of the spatial sensor based on the spatial sensor's relative distance to the first, second, and third wireless radios.

Measured position information of the spatial sensors may be logged periodically (e.g., every millisecond, every second, etc.) or conditionally on the occurrence or detection of an event (e.g., a crash) and stored in the system 100, for example, as an event log (e.g., crash log) in a data storage unit of the system or a remote storage unit communicatively coupled to the system. The crash log may include a timestamp to note the time of the measurement. Furthermore, detection of a vehicle crash may be facilitated by the use of the spatial sensors. For example, a crash may be detected when the on-board computing device and/or the mobile device operatively coupled to the spatial sensors notes a significant change in the position of one of the spatial sensors indicating that a vehicle part has moved more than a predetermined threshold distance from its original position relative to the vehicle. In some embodiments, when such significant change occurs, the measured position information may be provided to the processing center 102. Moreover, the distance a vehicle part moves may be used to determine the extent of the damage to the vehicle part. For example, spatial sensors disposed throughout the vehicle frame body may be used to detect a particular portion of the frame body has moved from its original alignment. If the particular portion of the frame body moves a few centimeters, realignment may be a faster and less expensive process than if the portion of the frame body moves a meter.

Figure 4:
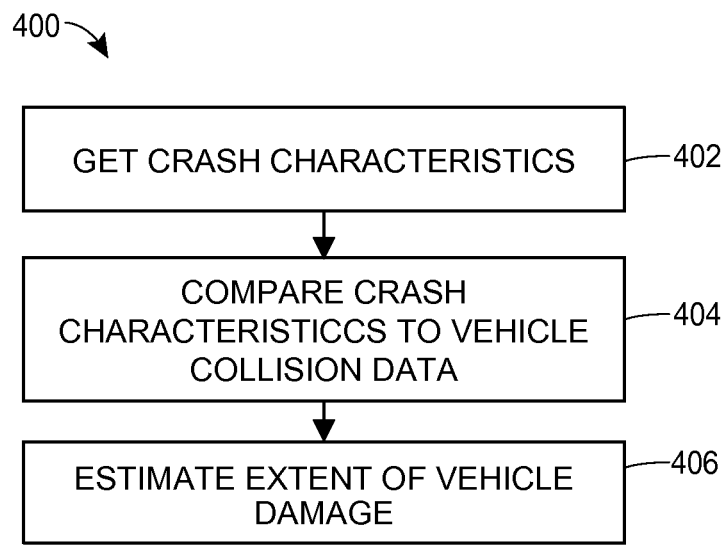
FIG. 4 depicts an example method for estimating the extent of vehicle damage in accordance with the presently described embodiments.

A flow diagram 400 of an example embodiment for estimating the extent of vehicle damage is depicted in FIG. 4. Some or all of the method for estimating the extent of vehicle damage may be implemented by system personnel and/or the processing center 102. In particular, system personnel may utilize crash characteristics provided by an individual present at the crash site, such as the driver and/or occupant of the damaged vehicle or an emergency responder (block 402). For example, descriptions and images of the damaged vehicle and an approximate speed of the vehicle at the time of the crash and the direction of where the vehicle was damaged may be provided to system personnel by the driver of the vehicle. Alternatively, system personnel and/or the processing center 102 may utilize crash characteristics automatically attained by telematics devices operatively coupled to the vehicle. Some examples of crash characteristics include, and are not limited to, vehicle acceleration, velocity, position of vehicle parts within the vehicle, and/or direction. Some crash information may be attained by an accelerometer and an array of sensors including spatial sensors at the time of the crash and the transmitted via a wireless communication module to system personnel and/or the processing center 102. System personnel and/or the processing center 102 may then analyze the crash information. In one example embodiment, system personnel and/or the processing center 102 may compare various combinations crash characteristics to collision data (block 404). The collision data may include historical loss information of similar type vehicles damaged in past collisions. The collision data may be compiled from past collisions and/or from laboratory crash test results involving other vehicles of the same or similar type as the damaged vehicle. The collision data may further include one or several combinations of impact or collision characteristics that are equated and/or associated to a known amount of vehicle damage. For example, vehicle damage associated with front-end impacts at various vehicle speeds may be associated with a list of vehicle parts likely to need repair and/or replacement from such impacts. By comparing the crash characteristics of the damaged vehicle to impact and/or collision characteristics of the collision data, an extent of damage to the damaged vehicle may be estimated (block 406). In some embodiments, an extent of damage to individual vehicle parts of the damaged vehicle may be estimated by comparing the crash characteristics associated with individual vehicle parts to impact and/or collision characteristics of the collision data.

Figure 5A:
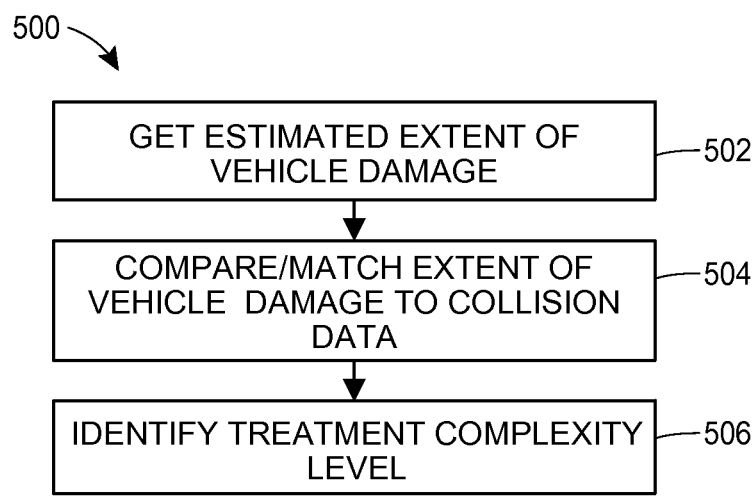
FIG. 5A depicts an example method for determining the treatment complexity level of the damaged vehicle in accordance with the presently described embodiments.

FIG. 5A depicts a flow diagram 500 of an example embodiment for estimating the treatment complexity level, which may be accomplished by system personnel and/or the processing center 102. The collision data may include a range of treatment complexity levels associated with various amounts of vehicle damage. In general, a treatment complexity level represents the difficulty associated with treating the damaged vehicle and may include or be associated with a pricing schema having a predetermined price structure for treating the damaged vehicle. A range of vehicle treatment complexity levels may be delineated by the amount of involvement associated with treating the damaged vehicle, for example, repairing and/or replacing vehicle parts of the damaged vehicle, or to scrap the damaged vehicle. Each treatment complexity level may include estimates or indications of the repair time and cost associated with the type and amount of vehicle body parts that may be damaged, e.g., body panel (front, side, rear, quarter-panel, rocker panel, driver-side, and passenger-side), bumper, radiator, lights, water pump, battery, struts, frame, and gas tank. The estimate or indicator of the cost, time and/or repair skill associated with repairing a damage vehicle may include one or more damage repair codes.

The several levels of treatment complexity may include a speed or light repair, a medium or moderate repair, a heavy or severe repair, not repairable, scrap, and salvage, for example. A speed or light repair treatment designation may indicate or estimate that one or two vehicle parts need repair or replacement, or that minor refinishing may be required, but that no structural damage occurred to the vehicle. A medium or moderate repair treatment designation may indicate that a few vehicle parts require repair or replacement or that light structural damage occurred to the vehicle. A heavy or extensive repair treatment designation may indicate that the vehicle is not drivable, significant structural damage occurred to the vehicle, more than five vehicle parts need repair or replacement, or a welded-on vehicle component needs replacement. A scrap designation may indicate that the vehicle is to be scrapped not repaired. Prior to scrapping, the damaged vehicle may be dismantled to salvage any undamaged or usable vehicle parts. In some embodiments, the treatment complexity level represents the difficulty associated with treating individual vehicle parts within the damaged vehicle.

The estimated extent of vehicle damage attained by system personnel and/or the processing center 102 may include a list of vehicle parts estimated to be damaged (block 502). By comparing and matching the damaged list of vehicle parts to the vehicle collision data (block 504), system personnel and/or the processing center 102 may identify the requisite treatment complexity level (block 506). For example, a vehicle damage estimate requiring less than 10 hours of repair time or $1000 in vehicle parts and labor may be designated as a low treatment complexity level; a vehicle damage estimate requiring between 10-15 hours of repair time or between $1000-$2500 in vehicle parts and labor may be designated as a medium treatment complexity level; a vehicle damage estimate requiring between 15-30 hours of repair time or between $2500-$5000 in vehicle parts and labor may be designated as a high treatment complexity level; and a vehicle damage estimate requiring more than 30 hours of repair time, or having costs in vehicle parts and labor greater than the value of the damaged vehicle in an undamaged condition, may be designated as a scrapping treatment complexity level.

Figure 5B:
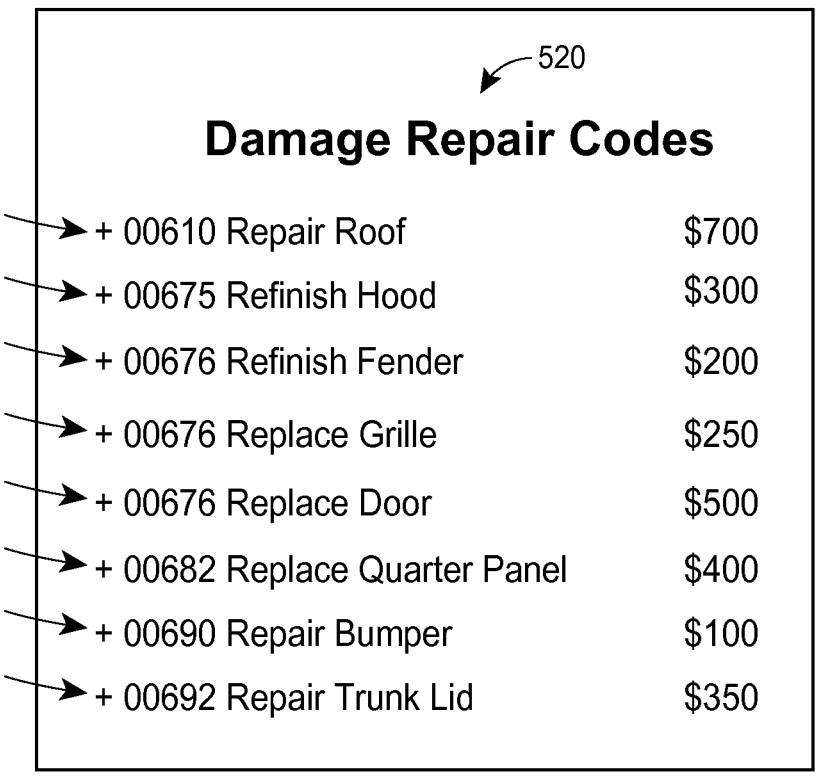
FIG. 5B depicts an example table of damage repair codes for estimating the cost of repairing vehicle damage in accordance with the presently described embodiments.

FIG. 5B depicts an example table 520 of damage repair codes for estimating the cost of repairing vehicle damage. The example table 520 includes example repair codes which may be a small subset of a larger set of repair codes. As mentioned above, the set of repair codes may include a separate repair code for each combination of vehicle characteristics such as make and model of the vehicle being repaired, the vehicle part being repaired, the type of repair for the vehicle part including whether the vehicle part needs to be repaired and/or replaced, the extent of the damage to the vehicle part, etc. Each repair code may correspond to a cost estimate, where the cost estimate may be determined based on collision data including historical loss information of similar type vehicles having similar type damage. For example, the associated cost estimate for a repair code corresponding to repairing the quarter panel of a Ford *Taurus* having moderate damage may be determined by analyzing repair costs from historical loss information related to repairing quarter panels of Ford Tauruses having moderate damage from past collisions. In some embodiments, the repair codes may be stored in the system 100 and/or operatively coupled to the processing center 102.

As shown in FIG. 5B, repair code 00675 (reference 522) is associated with an instruction, "Refinish Hood," and a cost estimate, $300. While the instruction for repair code 00675 (reference 522) does not specify the extent of the damage to the hood, or the make and model of the vehicle, repair code 00675 (reference 522) may be used for refinishing hoods of Honda Civics with light damage. In some embodiments, a separate repair code, for example, 10675 may be used for refinishing hoods for vehicles of a different make and/or model with light damage. Moreover, yet another repair code, for example, 02675, may be used for refinishing hoods for Honda Civics with moderate damage. Further, in some embodiments, the set of repair codes may be generated based on additional or alternative vehicle characteristics and in other embodiments some of the above mentioned vehicle characteristics may be omitted when generating the set of repair codes.

In any event, repair code 00610 (reference 521) is associated with the instruction, "Repair Roof," and a cost estimate of $700; repair code 00676 (reference 524) is associated with the instruction, "Refinish Fender," and a cost estimate of $200; repair code 00678 (reference 526) is associated with the instruction, "Replace Grille," and a cost estimate of $250; repair code 00679 (reference 528) is associated with the instruction, "Replace Door," and a cost estimate of $500; repair code 00682 (reference 530) is associated with the instruction, "Replace Quarter Panel," and a cost estimate of $400; repair code 00690 (reference 532) is associated with the instruction, "Repair Bumper," and a cost estimate of $100; and repair code 00692 (reference 534) is associated with the instruction, "Repair Trunk Lid," and a cost estimate of $350. Each of these repair codes may be for the same vehicle make and model, for example, a Honda Civic, and may be aggregated and/or combined to estimate the total cost of repair for a damaged Honda Civic. For example, by comparing crash information for a damaged Honda Civic to collision data, a list of damaged vehicle parts including the extent of the damage to each vehicle part may be generated as described above in FIG. 4. A repair code from the set of repair codes may then be assigned to each damaged vehicle part in the list based on the vehicle characteristics for the damaged vehicle. For example, repair code 00679 (reference 528) may be assigned when a door in the Honda Civic needs to be replaced. In some embodiments, repair code 00679 may be assigned twice when two doors in the Honda Civic need to be replaced.

While the example table 520 depicts eight repair codes, this is merely for ease of illustration only. There may be hundreds or thousands of repair codes each corresponding to a different combination of vehicle characteristics. More specifically, each make and model may correspond to a separate subset of repair codes including each combination of vehicle characteristics. For example, repair codes 00600-00699 may correspond to Honda Civics, while repair codes 00700-00799 may correspond to Honda Accords. The make and model for the vehicle may be determined using the VDI/VIN data for the damaged vehicle as described above with reference to FIG. 1. Moreover, in some embodiments, repair codes may also be used in salvaging and/or scrapping treatments. For example, the repair code 19986 may be used for salvaging hoods of Honda Civics in good condition. The associated cost estimate may be a price estimate of the market value of the vehicle part assuming it is sold to a treatment facility or any other auto body shop. The salvage repair codes may have an inverse relationship with the other repair codes. For example, for the salvage repair codes, vehicle parts in better condition may have higher associated price estimates, whereas for the other repair codes, the cost estimates become higher when there is more work that needs to be done to repair the vehicle part. Further, the price estimate may be based on the scarcity/demand for the vehicle part. For example, vehicle parts from a classic car (e.g., a 1964 Chevrolet Corvette), may be in high demand because the car is no longer manufactured. The price estimates for salvage repair codes may be aggregated to determine the total price that an insurance provider can recover by salvaging vehicle parts.

Figure 5C:
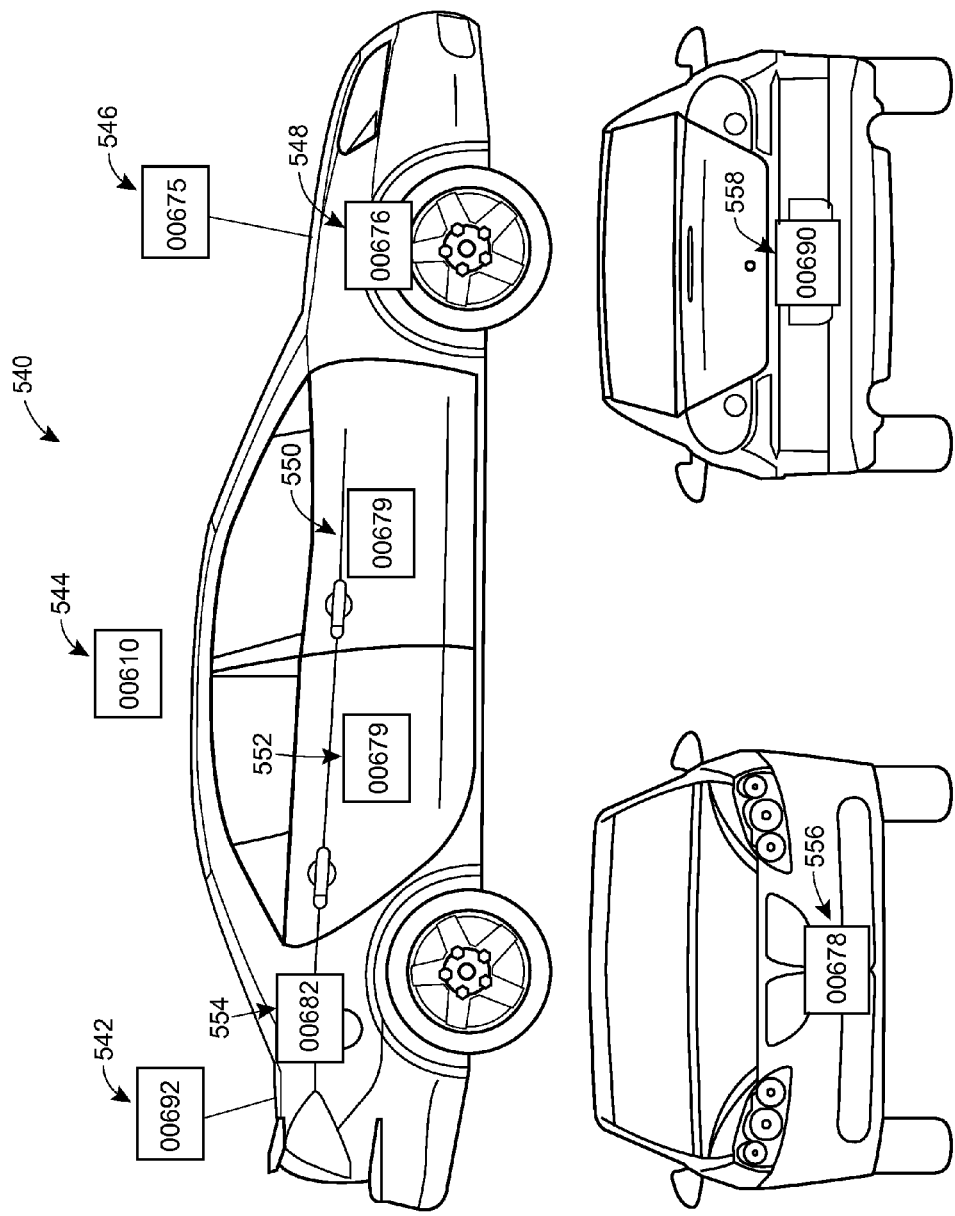
FIG. 5C depicts an example damaged vehicle including repair codes for various vehicle parts in accordance with the presently described embodiments.

FIG. 5C depicts an example damaged vehicle 540 including repair codes for various vehicle parts. Continuing the example from FIG. 5B, the damaged vehicle 540 may be a Honda Civic, and as a result, repair codes 00600-00699 may be assigned to estimate the cost of repairing the vehicle. Moreover, in some embodiments, the repair codes may be provided to a treatment facility for treating the damaged vehicle so the treatment facility knows what needs to be done to repair the vehicle without having to perform an inspection. The repair codes also may be provided to ensure the treatment facility does not miss anything during the repair.

In any event, crash information for the damaged vehicle 540 may be compared to collision data including historical loss information of similar type vehicles damaged in past collisions to determine which vehicle parts are damaged, and the extent of the damage to the vehicle parts including the type of repair necessary (e.g., whether the vehicle part needs to be repaired and/or replaced) as described above in FIG. 4. A repair code from the set of repair codes may then be assigned to each damaged vehicle part in the list based on the vehicle characteristics for the damaged vehicle.

In the example damaged vehicle 540, the two doors 550 and 552 are assigned the repair code 00679 "Replace Door" with an associated cost estimate of $500 for each door. The front, right fender 548 is assigned repair code 00676 "Refinish Fender" with an associated cost estimate of $200, the hood 546 is assigned repair code 00675 "Refinish Hood" with an associated cost estimate of $300, and the roof 544 is assigned repair code 00610 "Replace Roof" with an associated cost estimate of $700. Further, the trunk lid 542 is assigned repair code 00692 "Repair Trunk Lid" with an associated cost estimate of $350, and the rear quarter panel 554 is assigned repair code 00682 "Replace Quarter Panel" with an associated cost estimate of $400. Additionally, the grille 556 is assigned repair code 00678 "Replace Grille" with an associated cost estimate of $250, and the bumper 558 is assigned repair code 00690 "Repair Bumper" with an associated cost estimate of $100. Combining the cost estimates for each of the repair codes corresponding to the damaged vehicle parts, the total cost for repairing the vehicle may be estimated as $3300. This estimate may be used to pay the policy-holder on the insurance claim, and/or to provide a treatment facility with an expectation of the cost of repair for the damaged vehicle.

Figure 5D:
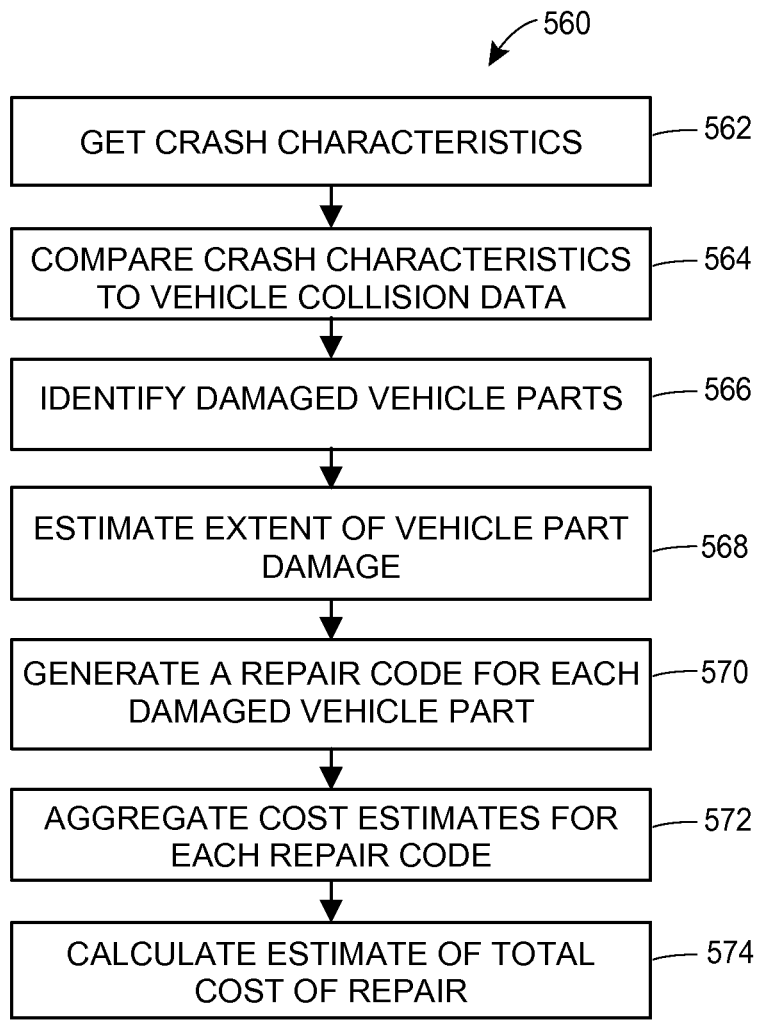
FIG. 5D depicts an example method for estimating the cost of repair for a damaged vehicle in accordance with the presently described embodiments.

FIG. 5D depicts a flow diagram 560 of an example method for estimating the cost of repairing the damaged vehicle. As described above, after a crash, system personnel and/or the processing center 102 may utilize crash characteristics provided by an individual present at the crash site, such as the driver and/or occupant of the damaged vehicle or an emergency responder (block 562). For example, descriptions and images of the damaged vehicle and an approximate speed of the vehicle at the time of the crash and the direction of where the vehicle was damaged may be provided to system personnel by the driver of the vehicle. Alternatively, system personnel and/or the processing center 102 may utilize crash characteristics automatically attained by telematics devices operatively coupled to the vehicle. Some examples of crash characteristics include, and are not limited to, VDI/VIN data, vehicle acceleration, velocity, position of vehicle parts within the vehicle, and/or direction. Some crash information may be attained by an accelerometer and an array of sensors including spatial sensors at the time of the crash and then transmitted via a wireless communication module to system personnel and/or the processing center 102.

System personnel and/or the processing center 102 may then analyze the crash information. In one example embodiment, system personnel and/or the processing center 102 may compare various combinations of crash characteristics to collision data (block 564). The collision data may include historical loss information of similar type vehicles damaged in past collisions. The collision data may be compiled from past collisions and/or from laboratory crash test results involving other vehicles of the same or similar type as the damaged vehicle. The collision data may further include one or several combinations of impact or collision characteristics that are equated and/or associated to a known amount of vehicle damage. For example, vehicle damage associated with front-end impacts at various vehicle speeds may be associated with a list of vehicle parts likely to need repair and/or replacement from such impacts. By comparing the crash characteristics of the damaged vehicle to impact and/or collision characteristics of the collision data, damage to individual vehicle parts may be identified (block 566). For example, the processing center 102 may identify damage to the hood, the rear quarter panel, the side panel, the roof, etc.

In addition to identifying damage to individual vehicle parts, the comparison may also be analyzed to determine the extent of the damage to vehicle parts (block 568). For example, the crash characteristics of the damaged vehicle may be compared to collision data to determine whether the damaged vehicle parts need to be repaired and/or replaced. In addition to determining whether the damaged vehicle parts need to be repaired, the comparison may also be analyzed to determine whether the repair will be a light, moderate, heavy, etc., repair.

Once the extent of the damage is estimated for each damaged vehicle part, a repair code from the set of repair codes is generated for each of the damaged vehicle parts (block 570). For example a repair code may correspond to a particular combination of vehicle characteristics such as the vehicle make and model, the vehicle part being repaired, the type of repair for the vehicle part including whether the vehicle part needs to be repaired and/or replaced, the extent of the damage to the vehicle part, etc. The repair code may be generated based on the vehicle characteristics for the damaged vehicle part, and may be associated with a cost estimate for repairing or replacing the vehicle part. The repair codes for each damaged vehicle part may then be aggregated (block 572) to calculate a total cost estimate of repairing the vehicle (block 574). The total cost estimate and each of the repair codes may be provided to a treatment facility to provide the treatment facility with an expectation of the cost of repair for the damaged vehicle, and so the treatment facility knows what needs to be done to repair the vehicle without having to perform an inspection. In some embodiments, the total cost estimate may also be provided to the policy-holder.

Figure 6A:
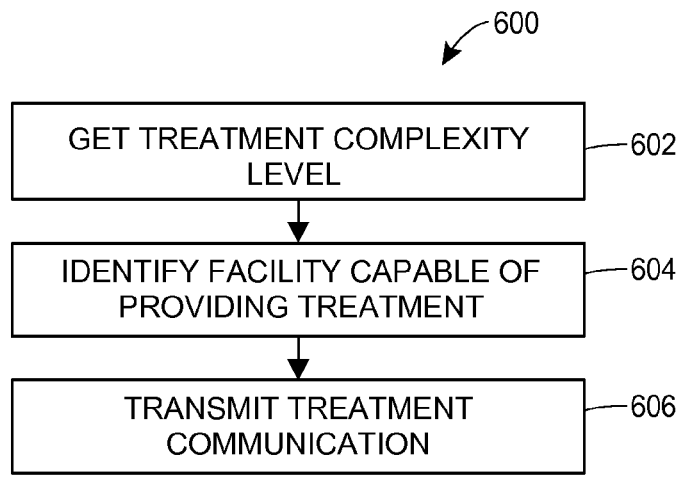
FIG. 6A depicts an example method for determining the treatment facility in accordance with the presently described embodiments.

FIG. 6A depicts a flow diagram 600 of an example method for identifying the treatment facility for treating the damaged vehicle. Once the treatment complexity level is estimated for each damaged vehicle part, system personnel and/or the processing center 102 may begin to determine an appropriate treatment facility for the damaged vehicle. The treatment complexity level is attained (block 602) and may be compared by system personnel and/or the processing center 102 to a list of treatment facilities that may be capable of providing the necessary treatment (block 604). Matching the estimated treatment complexity level with the treatment facilities in the list may be based on one or more factors, such as a pricing structure, treatment facility capability, treatment facility location, treatment facility quality rating/work quality history and/or certification, treatment facility availability, time, etc. and combinations thereof. One or more of these factors may also be weighted and/or prioritized by system personnel and/or the processing center 102 when determining a treatment facility for treatment of the vehicle. For example, a low complexity treatment generally may not require a high skill level and the convenience of a treatment facility near the vehicle owner may be considered to be more beneficial. Thus, for a low complexity treatment, the location factor of the treatment facility may be weighted and/or prioritized over some of the other factors. For medium or high complexity treatments, the skill level and/or performance record of the treatment facility may need to be higher, and thus weighted and/or prioritized over some of the other factors.

When a treatment facility is identified, a communication relating to the treatment of the damaged vehicle may be sent by system personnel and/or the processing center 102 (block 606). For example, the processing center 102 may transmit information associated with the treatment in the form of an SMS text, e-mail, phone call, facsimile, etc. to the identified treatment facility. The information may also be provided to the vehicle owner and/or other entities authorized by the vehicle owner, such as a collision repair facility, a vehicle scrap facility, emergency personnel, an insurance agent, etc. In addition, the information transmitted by the processing center 102 may include a request to the treatment facility or a vehicle transporter to transport the damaged vehicle to the identified treatment facility.

Figure 6B:
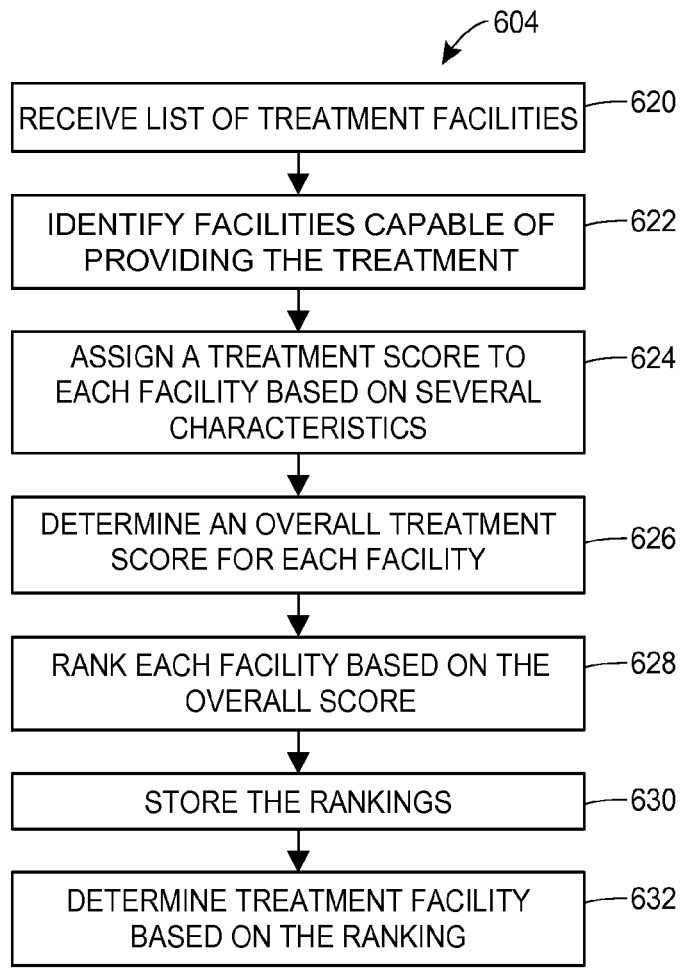
FIG. 6B depicts an example method for identifying treatment facilities as in FIG. 6A in accordance with the presently described embodiments.

FIG. 6B depicts an example method that can be executed at block 604 of the method 600 of FIG. 6A. The example method illustrates a more detailed version of the process for identifying and/or determining the treatment facilities of block 604 in more detail. System personnel and/or the processing center 102 may receive a list of treatment facilities within a geographic area (block 620). For example, a list of all treatment facilities, including repair and salvage centers, within 200 miles of the damaged vehicle may be received.

Each treatment facility may then be assigned to a treatment complexity level based on the treatment facility capability. For example, one set of treatment facilities may be designated as speed or light repair treatment facilities, while another set of treatment facilities may be designated as medium or moderate repair treatment facilities. Yet another set of treatment facilities may be designated as heavy or severe repair treatment facilities, another set as scrap and salvage treatment facilities, etc. The set of treatment facilities designated as speed or light repair treatment facilities may be capable of, for example, performing single day repair jobs requiring single panel repair for drivable vehicles. On the other hand, the set of treatment facilities designated as heavy or severe repair treatment facilities may be capable of, for example, ten day or more repair jobs requiring structural replacement and/or several panels damaged. In some embodiments, treatment facilities may be assigned to a treatment complexity level based on experience with damaged vehicles having the assigned treatment complexity. For example, a treatment facility that has worked with hundreds of vehicles requiring heavy or severe repairs may be designated as a heavy or severe repair treatment facility. Moreover, a treatment facility that has only performed a few heavy or severe repairs but has performed hundreds of speed or light repairs may be designated as a speed or light repair treatment facility.

Each set of treatment facilities corresponding to a particular complexity level may then be sorted and/or ranked to determine the most desirable treatment facilities for a given complexity level. For example, fifty treatment facilities within 200 miles of a damaged vehicle may be designated as medium or moderate repair facilities. The treatment facilities may then be ranked one through fifty based on several factors, and the highest ranking treatment facilities may be identified and/or selected for treating the damaged vehicle. At block 622, system personnel and/or the processing center 102 identify facilities capable of providing the treatment. For example, if the damaged vehicle requires medium or moderate repairs, the fifty treatment facilities designated as medium or moderate repair facilities may be identified.

At block 624, a treatment score for each facility capable of providing the treatment (e.g., designated as medium or moderate repair treatment facilities), may be assigned based on one or more several treatment facility evaluation characteristics. The treatment facility evaluation characteristics may include repair duration data for the treatment facility, a treatment facility quality rating, a treatment facility availability, a price schedule for treating damaged vehicles, treatment facility location data, a ranking for one or more suppliers used by the treatment facility, or any combination thereof.

In particular, the processing center 102 may determine repair duration data for each treatment facility which may include the time it took the treatment facility to complete past vehicle treatment jobs. The repair duration data may also include the time it took the treatment facility to complete past vehicle treatment jobs requiring similar treatment and/or for a similar vehicle type as the damaged vehicle. For example, the repair duration data may include an indication that John Smith's Repair Shop takes an average of five days to complete speed or light repairs for Hondas requiring repairs on the bumper. Each treatment facility may be assigned a repair duration treatment score, for example, ranging from zero to ten based on the repair duration data. For example, a treatment facility which takes an average of five days to complete similar treatment for a similar vehicle as the damaged vehicle may receive a higher treatment score than a treatment facility which takes an average of seven days.

The processing center 102 may also determine a quality rating for each treatment facility. The quality rating may be a numerical score, for example, ranging from zero to five, may be a category (e.g., "high," "medium," "low," "poor," etc.), may be a percentage, etc. The quality rating may be determined based on reviews for each treatment facility, for example, online reviews detailing customer satisfaction with the repairs, and/or may be determined based on historical data for the treatment facility. For example, damaged vehicles treated by treatment facilities which later have further complications due to the repair may reduce the quality rating of the treatment facilities. The quality rating may also be specific to the type of vehicle. For example, John Smith's repair shop may have a very high quality rating for repairing Hondas based on customer reviews and/or historical data, but may have a low quality rating for repairing Ferraris. In any event, each treatment facility may be assigned a quality rating treatment score, for example, ranging from zero to five based on the quality rating.

Further, the processing center 102 may receive availability information for each treatment facility. The availability information may be received from the treatment facility's website, from system personnel contacting the treatment facility, from a notification or alert from the treatment facility, for example, after the treatment facility receives a notification that the vehicle has been damaged, etc. In some embodiments, the availability information may include the date that the treatment facilities can begin treatment for the damaged vehicle. Moreover, the availability information may also include the time (e.g., morning, afternoon, evening, 11 a.m., 2 p.m., etc.) that the treatment facilities can begin treatment. Each treatment facility may be assigned an availability treatment score, for example, ranging from zero to twenty based on how soon the treatment facility can begin treatment for the damaged vehicle.

Additionally, the processing center 102 may determine a price structure for each treatment facility which may include previous prices for completing similar treatment for similar vehicles as the damaged vehicle. While the processing center 102 determines a cost estimate for treating the damaged vehicle by, for example, aggregating cost estimates associated with a set of repair codes, the processing center 102 may obtain data on variations from the cost estimate for each treatment facility. For example, if John Smith's repair shop consistently charges $100 more than the cost estimate based on the repair codes, then the price variation for John Smith's repair shop may be determined as +$100. On the other hand, if Dorothy Johnson's repair shop consistently charges $200 less than the cost estimate based on the repair codes, then the price variation for Dorothy Johnson's repair shop may be determined as −$200. Each treatment facility may be assigned a price variation treatment score, for example, ranging from zero to fifteen based on price variation. In some embodiments, treatment facilities having the lowest price variations may receive the highest price variation treatment scores.

The processing center 102 may also assign location treatment scores based on location data for the treatment facility. More specifically, the location treatment scores may be assigned based on a particular treatment facility's proximity to the damaged vehicle. For example, a treatment facility located five miles from the damaged vehicle may receive a higher location treatment score than a treatment facility located fifty miles from the damaged vehicle.

Moreover, the processing center 102 may determine a ranking for the suppliers who provide replacement vehicle parts to each of the treatment facilities. The suppliers may be ranked in a similar manner as the treatment facilities based on several factors such as duration data for the supplier, quality of the parts, proximity of the supplier to the treatment facility that the supplier provides parts to, or any combination thereof. The process for ranking suppliers of the treatment facilities is described in more detail below with reference to FIG. 6C. In any event, each treatment facility may be assigned a supplier treatment score, for example, ranging from zero to thirty based on the ranking for the supplier who provides replacement parts to the treatment facility. The above mentioned treatment facility evaluation characteristics are merely example or possible treatment facility evaluation characteristics which may be used to rank the treatment facilities capable of performing vehicle treatment at a particular treatment complexity level. Additional or alternative treatment facility evaluation characteristics may also be used to rank the treatment facilities, and/or in some embodiments, one or more of the treatment facility evaluation characteristics may be omitted.

In any event, after a treatment score is assigned to each treatment facility for each of the several determined treatment facility evaluation characteristics, an overall treatment score is determined for each treatment facility (block 626) by aggregating and/or combining the treatment scores. For example, the treatment scores may be added together, weighted, scaled, or otherwise mathematically combined as desired to determine an overall treatment score for a treatment facility. In an example scenario, the location treatment score may be weighted more heavily than the quality rating treatment score when ranking speed or light repair treatment facilities. Because the speed or light repair treatment facilities generally do not require high skill levels, proximity may be more significant than skill The processing center 102 may then rank the treatment facilities capable of performing vehicle treatment at a particular treatment complexity level based on their respective overall treatment scores (block 628). For example, the treatment facility having the highest overall treatment score may be ranked first while the treatment facility having the lowest overall treatment score may be ranked last. The rankings for the treatment facilities may then be stored at the processing center 102 for the damaged vehicle (block 630). In some embodiments, the processing center 102 may store several sets of rankings for the damaged vehicle, each set corresponding to treatment facilities assigned to a different treatment complexity level. For example, the processing center 102 may store a set of rankings for the damaged vehicle of speed or light repair treatment facilities, a set of rankings of medium or moderate repair treatment facilities, a set of rankings of heavy or severe repair treatment facilities, a set of rankings of salvage treatment facilities, etc. The rankings may be updated based on changes to historical data for the treatment facilities, such as average price variation, average duration, quality rating, etc.

Then, a treatment facility for treating the damaged vehicle may be determined based on the rankings (block 632). For example, if the treatment complexity level for the damaged vehicle is speed or light repair, the processing center 102 may automatically select the highest ranking speed or light repair treatment facility. In some embodiments, the processing center 102 may transmit a display to a computing device, allowing a user such as a policy-holder and/or owner of the damaged vehicle to select a treatment facility from a list of the highest ranking speed or light repair treatment facilities, (e.g., a list of speed or light repair treatment facilities ranking above a predetermined threshold ranking such as the three highest ranking facilities). In other embodiments, the processing center 102 may transmit a display to a computing device including all of the speed or light repair treatment facilities and including the respective ranking for each facility. In any event, once the treatment facility is selected, the processing center 102 may transmit information associated with transporting the damaged vehicle to the selected treatment facility. Such information may include a request to transport the damaged vehicle from the crash site directly to the treatment facility. The request to transport the vehicle may be sent to the selected treatment facility or to a vehicle transporter 114 capable of transporting damaged vehicles from collision sites.

In addition to ranking treatment facilities, system personnel and/or the processing center 102 may rank suppliers who provide vehicle parts to the treatment facilities as described above. In some embodiments, the supplier ranking for a supplier who provides vehicle parts to a treatment facility may be a treatment facility evaluation characteristic. For example, each treatment facility may be assigned a supplier treatment score, for example, ranging from zero to thirty based on the ranking for the supplier who provides replacement parts to the treatment facility. In some scenarios, more than one treatment facility may use the same supplier resulting in each of these treatment facilities receiving the same or similar supplier treatment scores. Moreover, a treatment facility may use more than one supplier. In this scenario, the supplier treatment scores for each supplier may be averaged and/or weighted based on the frequency at which the treatment facility uses each respective supplier.

Figure 6C:
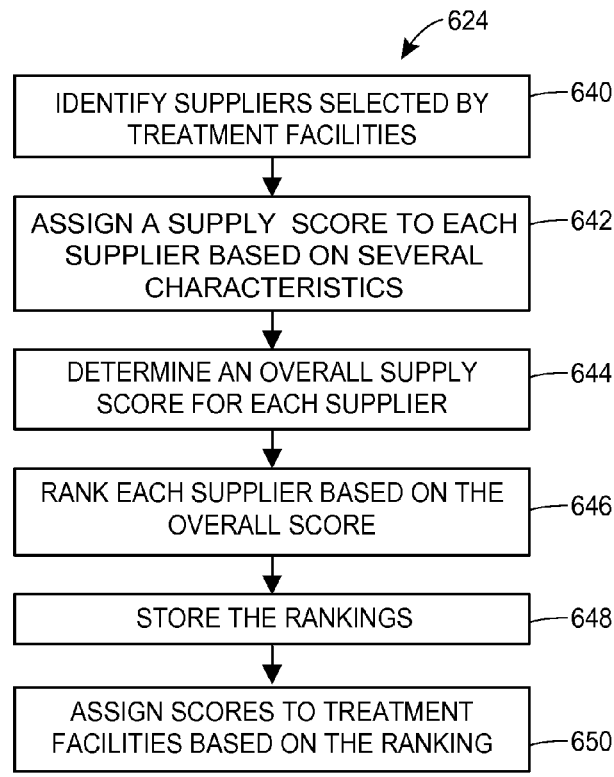
FIG. 6C depicts an example method for ranking vehicle parts suppliers in accordance with the presently described embodiments.

In any event, FIG. 6C depicts an example method for ranking suppliers of treatment facilities that can be executed as part of the block 624 of the method 604 of FIG. 6B. At block 640, the system personnel and/or the processing center 102 may receive a list of suppliers used by the treatment facilities identified in the list of treatment facilities received at block 620 of the method 604 of FIG. 6B. Each treatment facility may provide one or more suppliers that the treatment facility prefers to use and/or the processing center 102 may determine which suppliers provide parts to a treatment facility based on historical data from previous collisions. For example, if after a previous collision John Smith's repair shop ordered parts from Bill's supply center, the processing center 102 may determine that John Smith's repair shop uses Bill's supply center to order parts from.

At block 642, a supply score for each supplier may be assigned based on one or several supplier evaluation characteristics. The supplier evaluation characteristics may include duration data for the supplier, quality of the parts, proximity of the supplier to the treatment facility that the supplier provides parts to, or any combination thereof.

More specifically, the duration data for the supplier may be similar to the repair duration data for the treatment facilities as described above in FIG. 6B. For example, the duration data for the supplier may include data on the time it took the supplier to deliver vehicle parts from past repairs. In some embodiments, the data for the supplier may include data on the time it took the supplier to deliver similar parts as those needed for the damaged vehicle. The duration data may also include a frequency in which the supplier meets certain delivery times, e.g., delivery times specified by the treatment facility or estimated delivery times. Each supplier may be assigned a duration supply score, for example, ranging from zero to ten based on the duration data. For example, a supplier which takes an average of two days to deliver vehicle parts may receive a higher duration supply score than a supplier which takes an average of four days.

The processing center 102 may also assign proximity supply scores based on the proximity of the supplier to a respective treatment facility which orders parts from the supplier. For example, a supplier located 30 miles from a respective treatment facility may receive a higher proximity supply score than a supplier location 200 miles from a respective treatment facility.

The above mentioned supplier evaluation characteristics are merely example or possible supplier evaluation characteristics which may be used to rank the suppliers. Additional or alternative supplier evaluation characteristics may also be used to rank the suppliers, and/or in some embodiments, one or more of the supplier evaluation characteristics may be omitted.

In any event, after a supply score is assigned to each supplier for each of the several determined factors, an overall supply score is determined for each supplier (block 644) by aggregating and/or combining the supply scores for the supplier. For example, the supply scores may be added together, weighted, scaled, or otherwise mathematically combined as desired to determine an overall supply score for a supplier.

The processing center 102 may then rank the suppliers based on their respective overall supply scores (block 646). For example, the supplier having the highest overall supply score may be ranked first while the supplier having the lowest overall treatment score may be ranked last. The rankings for the suppliers may then be stored at the processing center 102 for the damaged vehicle (block 648). The rankings may be updated based on changes to historical data for the suppliers, such as average duration, parts quality rating, etc.

Then, a supply treatment score may be assigned to each of the treatment facilities as described with reference to FIG. 6B, based on the rankings for the suppliers (block 650). For example, a treatment facility which receives vehicle parts from a highly ranked supplier may be assigned a high supply treatment score.

Figure 6D:
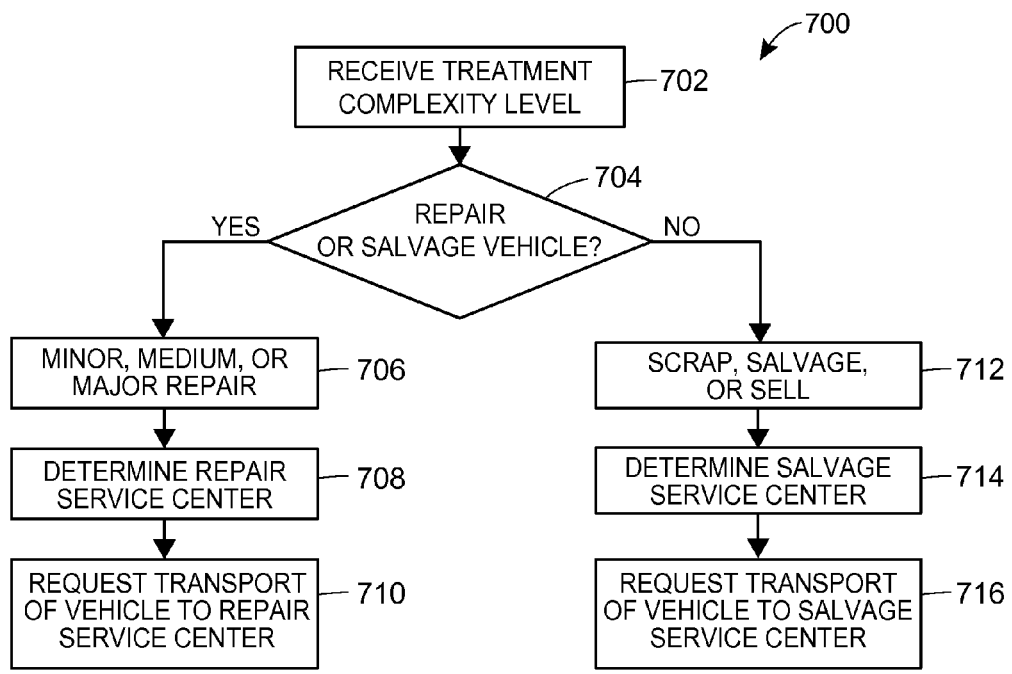
FIG. 6D depicts an example method for treating the damaged vehicle in accordance with the presently described embodiments.

Another example method for identifying the treatment facility for treating the damaged vehicle is depicted in the flow diagram 700 shown in FIG. 6D. System personnel and/or the processing center 102 receive the treatment complexity level (block 702), which may then be compared to vehicle collision data. The vehicle collision data may comprise empirical data including measurements of damaged vehicles of the same or similar type to that of the vehicle damaged in the crash. Based on the comparison, a determination of the type of treatment for the damaged vehicle may be made, generally, to repair the vehicle or salvage the vehicle (block 704). The determination of the type of treatment may be made by system personnel and/or the processing center 102 evaluating the extent of vehicle damage by, for example, comparing one or more characteristics of the damaged vehicle's crash information to a hierarchy of vehicle collision data of similar type vehicles. Other characteristics relevant to determining the type of treatment for the damaged vehicle may include various factors associated with repairing or salvaging the damaged vehicle, such as, for example: the dynamic market value of one more damaged and/or undamaged vehicle parts; the dynamic market value of one or more damaged and/or undamaged vehicle parts defined within one or more vehicle repair codes; the type of skill and resources necessary to repair the damaged vehicle and/or vehicle parts; and the type of skill and resources necessary to salvage the damaged vehicle and/or damaged vehicle parts. As noted above, the significance or magnitude associated with one or more factors utilized in determining the treatment complexity level of the damaged vehicle may change. For example, the market value for an undamaged vehicle and/or its vehicle parts may fluctuate if the market demand for such vehicle and/or vehicle parts increases or decreases.

It is therefore contemplated by this invention to monitor such dynamic changes in the market value of one or more factors included within the determination of the treatment complexity level to provide a timely and more accurate treatment for a damaged vehicle.

If the damaged vehicle is to be repaired, an extent of the repairs may be determined (block 706). The range of repair levels may vary from minor to medium to major and the range may be segmented in relation to the treatment complexity levels. In other words, one range of vehicle damages may be associated to one particular treatment complexity level.

The time and cost to repair the damaged vehicle may also be considered in the analysis to determine whether to repair or salvage the damaged vehicle. Additional factors that may also be considered in determining the treatment complexity level include the make, model, and year of the damaged vehicle, and the availability and/or market desirability for undamaged vehicle parts. For example, an older model vehicle may be more expensive to repair because replacement vehicle parts may be difficult to obtain. Once the repair level has been determined, a repair treatment facility may be selected (block 708). At a minimum, the selected repair treatment facility is capable of performing the level of repair necessary. Additional factors that may be considered when determining a repair treatment facility may include the proximity of the repair treatment facility to the damaged vehicle, e.g., collision site; the treatment facility's availability to timely repair the vehicle; and, a current or prior business relationship between the repair treatment facility and the entity using and/or administrating the treatment system 100. When the repair center is determined, information associated with the repair of the vehicle may be transmitted from system personnel and/or the processing center 102. Such information may include a request to transport the damaged vehicle from the crash site directly to the repair treatment facility (block 710). The request to transport the vehicle may be sent to the selected repair treatment facility or to a vehicle transporter 114 capable of transporting damaged vehicles from collision sites.

If the damage to the vehicle is too extensive or costly to be repaired, the damaged vehicle may be salvaged. In some instances where the damaged vehicle is determined to be a total loss, the vehicle may be immediately sold or put up for auction or scrapped and shredded for its scrap metal (block 712). Scrapping the vehicle may be appropriated for low dollar, high curb weight vehicles where the value of the damaged vehicle is perceived to be in the scrap metal. In other instances, the damaged vehicle may be dismantled to salvage any value associated with the damaged vehicle. For example, if the damaged vehicle includes undamaged vehicle parts, the vehicle may be dismantled and the undamaged vehicle parts may be harvested and stored in a storage facility 116 for later use and/or sale. The determination to sell or dismantle the damaged vehicle may include consideration of the treatment complexity level, the make, model, and year of the vehicle, and the market demand and/or desirability of particular harvested vehicle parts, e.g., at-risk vehicle parts for vehicles that are no longer in production. Additionally, a higher monetized recovery of the damaged vehicle may be attained if the damaged vehicle is partially repaired and/or dismantled to a varying extent, and then sold. For example, higher end and late model vehicles and/or vehicle parts may be prepared for sale. Such vehicles and vehicle parts, as well as rare or hard to find vehicles and vehicle parts may be privately or publicly sold or auctioned through a salvage treatment facility partnering with an entity using or administrating the treatment system 100. Any unwanted vehicle parts that remain after dismantling may be shredded or scrapped. Once the salvage level has been determined, a salvage treatment facility may be identified from among the salvage treatment centers (block 714). At a minimum, the selected salvage treatment facility is capable of performing the level of salvage necessary. Additional factors may also be considered to determine a particular salvage treatment facility. For example, the proximity of the salvage treatment facility to the damaged vehicle, e.g., crash site. Further considerations for determining a salvage treatment facility may also include the availability to timely salvage the vehicle, the existence of a current or prior business relationship between the salvage treatment facility and the entity using or administrating the treatment system 100, etc. When the salvage treatment facility is determined, information associated with the salvage of the vehicle may be transmitted by system personnel and/or the processing center 102. Such information may include a request to transport the vehicle to the identified salvage treatment facility (block 716). The request to transport the vehicle may be sent to the selected salvage treatment facility 112 or to a vehicle transporter 114 capable of transporting the damaged vehicle from the collision site to the salvage treatment facility.

Figure 7:
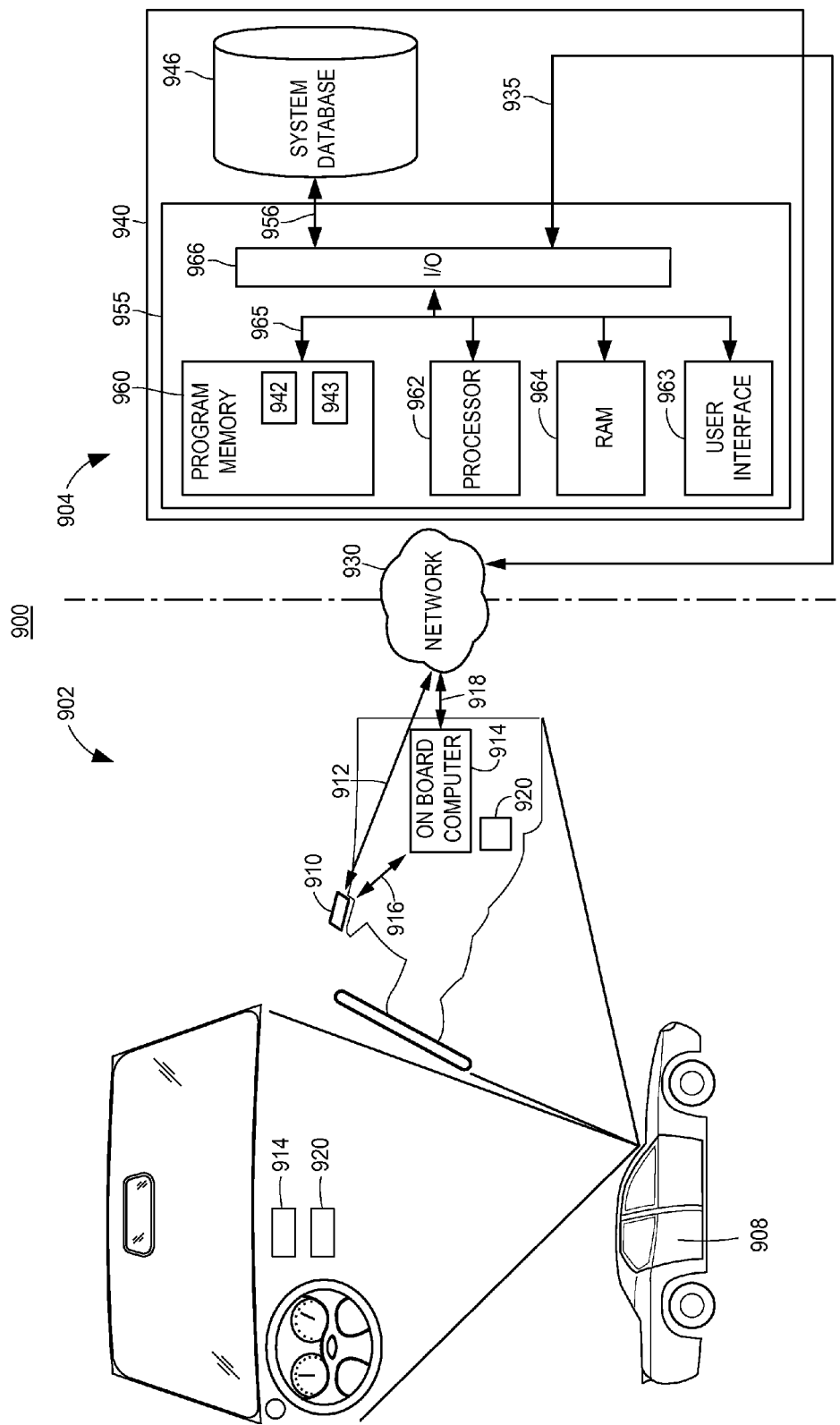
FIG. 7 is a block diagram depicting a mobile computing device, an on-board computing device, a server device, and a communication network that may configured in the example system for treating a damaged vehicle in accordance with the described embodiments.

FIG. 7 illustrates a block diagram of an example treatment system 900 capable of being incorporated into the treatment system 100 shown in FIG. 1 and supporting the processes described herein for treating a vehicle damaged in a crash. The high-level architecture of the vehicle treatment system 900 includes both hardware and software applications, as well as various data communications channels for communicating data between the various hardware and software components. The vehicle treatment system 900 may be divided into front-end components 902 and back-end components 904. The front-end components 902 include one or more computing devices, such as a mobile computing device 910 and/or an on-board computing device 914. Either computing device 910, 914 may be permanently or removably attached to a vehicle 908 and may interface with various sensors coupled to the vehicle 908 (e.g., a speedometer, an accelerometer, a compass, a global position unit (GPS), spatial sensor disposed throughout the vehicle, etc.) and/or may interface with various external output devices in the vehicle 908, such as one or more tactile alert systems, one or more speakers, one or more displays, etc.

Each of the mobile computing device 910 and the on-board computing device 914 is capable of performing all of the functions of the computing device described herein or may supplement the functions performed by the other computing device. The mobile computing device 910 and on-board computing device 914 may communicate with one another directly over a wired or wireless link 916. In addition, the mobile computing device 910 and the on-board computing device 914 may communicate with a network 930 over wired or wireless links 912, 918, respectively. The network 930 may be a proprietary network, a secure public internet, a virtual private network, or some other type of network, such as dedicated access lines, plain ordinary telephone lines, satellite links, etc., and combinations thereof. Where the network 930 comprises the internet, data communications may take place over the network 930 via an internet communication protocol.

The treatment system 900 may also include a notification alert system 920 (e.g., automatic collision notification (ACN), advanced automatic collision or crash notification (AACN), event data recorder (EDR)), that may record and/or transmit information associated with treating the vehicle 908 after being involved in a crash. The front-end components 902 and the back-end components 904 communicate via the communication network 930. The back-end components 904 include a computing device such as a server 940 device or system. The server device 940 may include one or more processors 962 adapted and configured to execute various software applications and/or modules of the vehicle treatment system 900, in addition to other software routines. The server device 940 may further include a database 946 adapted to store the various software applications, modules, and/or routines as well as data related to the operation of the vehicle treatment system 900. The data may include, for example, information collected by the mobile computing device 910 and/or the on-board computing device 914 pertaining to the vehicle treatment system 900 and uploaded to the server device 940, such as sensor inputs, analyses corresponding to the methods discussed above, and images. Other kinds of information that may be stored in the database may include historical vehicle collision data compiled from crash data involving vehicles categorized in the same or similar type of vehicle as the vehicle 908 and contact information relating to vehicle service repair and/or salvage treatment facilities, part suppliers, vehicle transporters, vehicle owner, insurance personnel, etc. The computing devices 910, 914 and/or server device 940 may access or store data and/or software applications in the database 946 when executing various functions and tasks associated with the operation of the vehicle treatment system 900.

Although the vehicle treatment system 900 is shown to include one server device 940, one mobile computing device 910, and one on-board computing device 914, it should be understood that additional server devices 940, mobile computing devices 910, and on-board computing devices 914 may be utilized. For example, the system 900 may include several server devices 940 and numerous mobile computing devices 910, all of which may be interconnected via the network 930. As discussed above, the mobile computing device 910 may perform the various functions described herein in conjunction with the on-board computing device 914 or alone. Likewise, the on-board computing device 914 may perform the various functions described herein in conjunction with the mobile computing device 910 or alone. In either instance, the mobile computing device 910 or on-board computing device may not need to be present. Furthermore, the processing performed by the one or more server devices 940 may be distributed among a plurality of server devices 940 configured in an arrangement known as "cloud computing." This arrangement may provide several advantages, such as, for example, enabling near real-time uploads and downloads of information as well as periodic uploads and downloads of information. This arrangement may provide for a thin-client embodiment of the mobile computing device 910 and/or on-board computing device 914 described herein as well as a primary backup of some or all of the data gathered by the mobile computing device 910 and/or on-board computing device 914. All of the information involved with the treatment system 100, for example, crash information, collision data, VDI/VIN data, images, historical loss information, damage evaluation tools, damaged vehicle parts list, inventory of vehicle parts stored at the storage facility, vehicle transporters, treatment centers, customer contact information, insurance agent/entity contact information, etc. may be displayed in a variety of formats at the server device 940, wherein system personnel and/or the processing center 102 is provided access to such information for treating the damaged vehicle.

The server device 940 may have a controller 955 that is operatively connected to the database 946 via a link 956. The controller 955 may also be operatively connected to the network 930 via a communication link 935. It should be noted that, while not shown, additional databases may be linked to the controller 955 in a known manner. The controller 955 may include a program memory 960, a processor 962 (e.g., a microprocessor or a microcontroller), a random-access memory (RAM) 964, input/output (I/O) circuitry 966, and a user interface module 963 all of which may be interconnected via an address/data bus 965. The user interface module 963 facilitates human-to-machine interaction and may include a display screen, keyboard, mouse device, microphone, speaker, etc. Although the I/O circuitry 966 is shown as a single block, the I/O circuitry 966 may include a number of different types of I/O circuits. The program memory 960 may be configured to store computer-readable instructions that when executed by the processor 962 cause the server device 940 to implement a server application 942 and/or a web server 943. The instructions for the server application 942 may cause the server device 940 to implement the methods described herein. While shown as a single block in FIG. 7, it will be appreciated that the server application 942 may include a number of different programs, modules, routines, sub-routines, etc., that may separately or collectively cause the server device 940 to implement the server application 942. It should also be appreciated that although only one processor 962 is shown, the controller 955 may include multiple processors and/or microprocessors. Similarly, the memory of the controller 955 may include multiple RAMs 964 and multiple program memories 960. The RAM(s) 964 and program memories 960 may be implemented as semiconductor memories, magnetically readable memories, and/or optically readable memories, for example. Further, while the instructions for the server application 942 and web server 943 are shown being stored in the program memory 960, the instructions may additionally or alternatively be stored in the database 946 and/or RAM 964.

Alternatively, the vehicle treatment system 900 may include only the front-end components 902. For example, a mobile computing device 910 and/or on-board computing device 914 may perform any and/or all of the processing associated with compiling or gathering crash information, determining a treatment complexity level based on the crash information, determining a treatment for the vehicle based on the a treatment complexity level; and transmitting information associated with the treatment of the vehicle.

Figure 8:
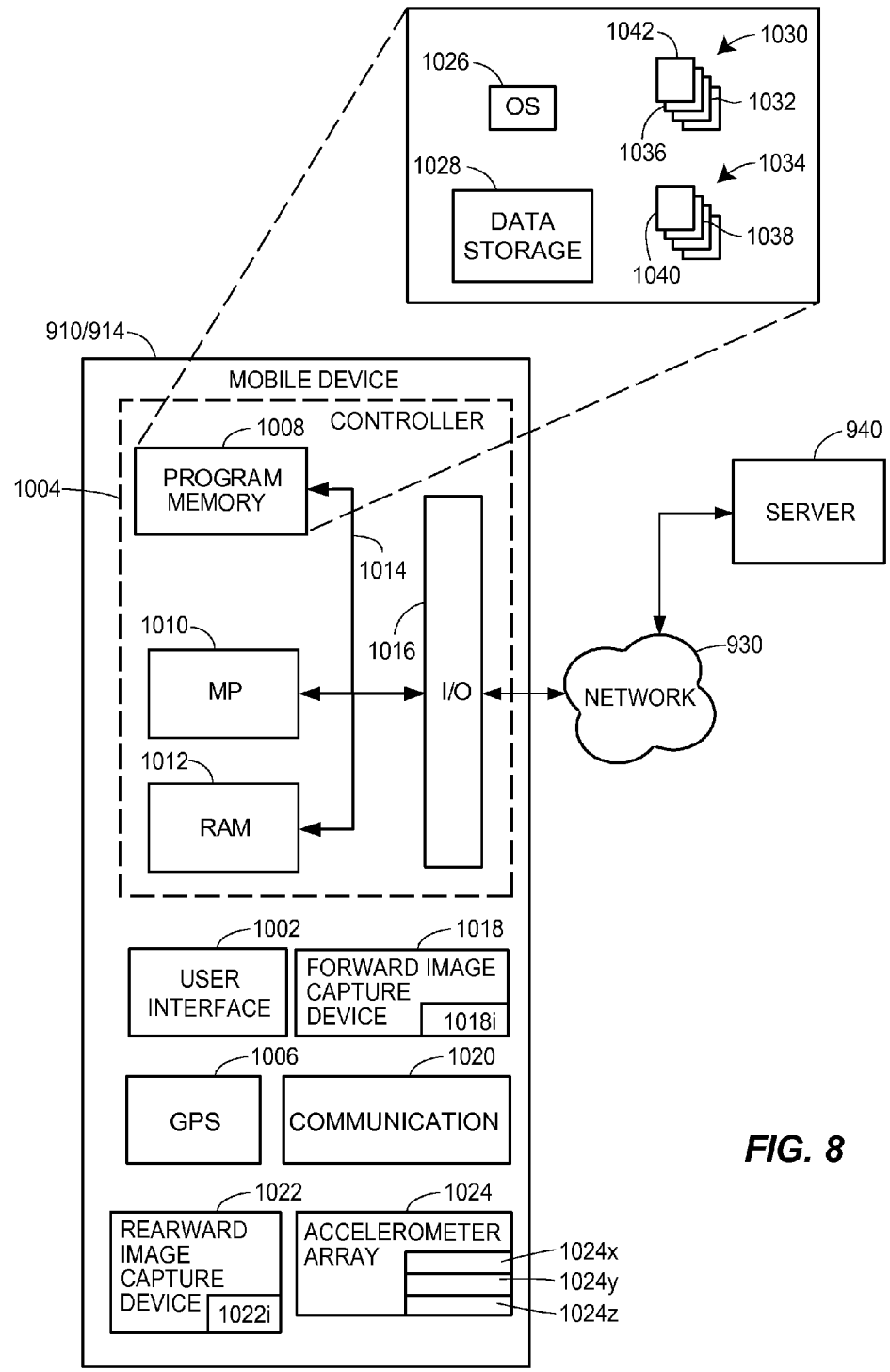
FIG. 8 is a block diagram of an example mobile computing device, on-board computing device, and/or server device capable of being implemented in the system shown in FIG. 7.

Referring now to FIG. 8, the mobile computing device 910 may include a user interface module 1002, a positioning module 1006 such as a global positioning system (GPS) module, a communication module 1020 which may include one or more wireless radios, a forward image capture module 1018, a rearward image capture module 1022, an accelerometer array 1024, and a controller 1004. Similarly, the on-board computing device 914 may include a user interface module 1002, a GPS module 1006, a communication module 1020 which may include one or more wireless radios, a forward image capture module 1018, a rearward image capture module 1022, an accelerometer array 1024, and a controller 1004.

The mobile computing device 910 and on-board computing device 914 may be integrated into a single device that can perform the functions of both devices. It will be appreciated that functions performed by either the mobile computing device 910 or the on-board computing device 914 may also be performed by the on-board computing device 914 in cooperation with the mobile computing device 910. The mobile computing device 910 may be a general-use mobile personal computer, cellular phone, smartphone, tablet computer, wearable computer (e.g., a watch, glasses, etc.), or a device dedicated to facilitating treatment of a damaged vehicle. The on-board computing device 914 may be a general-use on-board computer capable of performing the functions relating to vehicle operation or dedicated to facilitate treatment of a damaged vehicle. The on-board computing device 914 may be installed by the manufacturer of the vehicle 908 or as an aftermarket modification to the vehicle. Further, the mobile computing device 910 and/or on-board computing device 914 may be a thin-client device that outsources some or most processing to the server device 940.

Similar to the controller 955, the controller 1004 includes a program memory 1008, a microprocessor (MP) 1010, a random-access memory (RAM) 1012, and input/output (I/O) circuitry 1016, all of which are interconnected via an address/data bus 1014. Although the I/O circuitry 1016 is depicted in FIG. 8 as a single block, the I/O circuitry 1016 may include a number of different types of I/O circuits. The program memory 1008 includes an operating system 1026, a data storage device 1028, a plurality of software applications 1030, and a plurality of software routines 1034. The operating system 1026 may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 1028 may include application data for the plurality of applications 1030, routine data for the plurality of routines 1034, and other data necessary to interact with the server 940 through the network 930. In particular, the data storage device 1028 may include vehicle collision data associated with a vehicle type that includes the vehicle 908. The vehicle type may include the make, model, and year of the vehicle. The vehicle collision data may include one or more compilations of recorded measurements of damaged vehicle parts and components and the corresponding acceleration and derived vectors, e.g., velocity and direction, of such characteristics attributed for the damage. In some embodiments, the controller 1004 may also include, or otherwise be operatively coupled for communication with other data storage mechanisms (e.g., one or more hard disk drives, optical storage drives, solid state storage devices, etc.) that may reside within the mobile computing device 910 and/or on-board computer 914 or operatively coupled to the network 930 and/or server device 940.

The GPS module 1006 may use "Assisted GPS" (A-GPS), satellite GPS, or any other suitable global positioning protocol or system that locates vehicle 908 via the position of the mobile computing device 910 and/or on-board computing device 914. For example, A-GPS utilizes terrestrial cell phone towers or Wi-Fi hotspots (e.g., wireless router points) to more accurately and more quickly determine the location of the vehicle 908 via the mobile computing device 910 and/or on-board computing device 914 while satellite GPS is generally more useful in more remote regions that lack cell towers or Wi-Fi hotspots. The GPS module 1006 may also facilitate the determination of the velocity and direction of the vehicle 908, via the coupling of the mobile computing device 910 and/or on-board computing device 914 to the vehicle.

The accelerometer array 1024 is one example of a telematics device or module that may incorporate one or more accelerometers positioned to determine the acceleration and direction of movements of the mobile computing device 910 and/or on-board computing device 914, which effectively correlate to the acceleration and direction of movements of the vehicle 908. In some embodiments, the accelerometer array 1024 may include an X-axis accelerometer 1024$x$, a Y-axis accelerometer 1024$y$, and a Z-axis accelerometer 1024$z$ to measure the acceleration and direction of movement in each respective dimension. It will be appreciated by those of ordinary skill in the art that a three dimensional vector describing a movement of the vehicle 908 via the mobile computing device 910 and/or on-board computing device 914 through three dimensional space can be established by combining the outputs of the X-axis, Y-axis, and Z-axis accelerometers 1024$x, y, z$ using known methods. Single- and multi-axis models of the accelerometer 1024 are capable of detecting magnitude and direction of acceleration as a vector quantity, and may be used to sense orientation and/or coordinate acceleration of the vehicle 908.

The forward and rearward image capture module 1018, 1022 may be built-in cameras within the mobile computing device 910 and/or on-board computing device 914 and/or may be peripheral cameras, such as webcams, cameras installed inside the vehicle 908, cameras installed outside the vehicle 908, etc., that are communicatively coupled with the mobile computing device 910 and/or on-board computing device 914. The image capture module 1018, 1022 may be oriented toward the front and rear of the vehicle 908. For example, the forward image capture module 1018 may be oriented toward the front of the vehicle 908 to observe the forward area of the vehicle 908 while the rearward image capture module 1022 may be oriented toward the rear of the vehicle 908 to observe the rearward area of the vehicle 908, or vice-versa. Some embodiments of the treatment system 900 may have both a forward image capture module 1018 and a rearward image capture module 1022, but other embodiments may have only one or no image capture module. Further, either or both of the forward image capture module 1018 and the rearward image capture module 1022 may include an infrared illuminator 1018$i$, 1022$i$, respectively, to facilitate low light and/or night image capturing. Such an infrared illuminator 1018$i$, 1022$i$ may be automatically activated when light is insufficient for image capturing.

The GPS module 1006, the image capture modules 1018, 1022, and the accelerometer array 1024 may be referred to collectively as the "sensors" of the mobile computing device 910 and/or on-board computing device 914. Of course, it will be appreciated that additional GPS modules 1006, image capture modules 1018, 1022, and/or the accelerometer arrays 1024 may be operatively coupled to the mobile computing device 910 and/or on-board computing device 914. Further, the mobile computing device 910 and/or on-board computing device 914 may also include or be coupled to other sensors such as a thermometer, microphone, thermal image capture device, biomedical sensor, etc. The microphone may be incorporated with the user interface module 1002 and used to receive voice inputs from the vehicle operator while the thermometer and/or thermal image capture device may be used to determine fire or heat damage to the vehicle 908, and the biomedical sensor may capture biological characteristics of the vehicle operator.

The communication module 1020 may communicate with the server device 940 via any suitable wired or wireless communication protocol network, such as a wireless telephony network (e.g., GSM, CDMA, LTE, etc.), a Wi-Fi network (802.11 standards), a WiMAX network, a Bluetooth network, etc. The communication unit 1020 may also be capable of communicating using a near field communication standard (e.g., ISO/IEC 18092, standards provided by the NFC Forum, etc.).

The mobile computing device 910 and/or on-board computing device 914 may include the user-input interface 1002, which may include a "soft" keyboard that is presented on a display screen of the mobile computing device 910 and/or on-board computing device 914, an external hardware keyboard communicating via a wired or a wireless connection (e.g., a Bluetooth keyboard), and an external mouse, or any other suitable user-input device or component (see examples in FIG. 8). As described earlier, the user-input module 1002 may also include a microphone (not shown) capable of receiving voice input from a vehicle operator as well as a display screen.

With reference to the controllers 955, 1004, it should be appreciated that although FIG. 8 depicts only one microprocessor 1010, the controller 1004 may include multiple microprocessors 1010. The memory of the controller 1004 may also include multiple RAMs 1012 and multiple program memories 1008. The controller 1004 may implement the RAM 1012 and the program memories 1008 as semiconductor memories, magnetically readable memories, and/or optically readable memories, for example. The one or more processors 1010 may be adapted and configured to execute any of the plurality of software applications 1030 and/or any of the plurality of software routines 1034 residing in the program memory 1008, in addition to other software applications. One of the plurality of applications 1030 may be a client application 1032 that may be implemented as a series of machine-readable instructions for performing the various functions associated with implementing the vehicle treatment system 900 as well as receiving information at, displaying information on, and transmitting information from the mobile device 910 and/or the on-board computing device 914. A client application 1032 may function to implement a system wherein the front-end components 902 communicate and cooperate with back-end components 904 as described above. The client application 1032 may include machine-readable instructions for implementing the user interface 1002 to allow a user to input commands to, and receive information from, the vehicle treatment system 900. One of the plurality of applications 1030 may be a native web browser 1036, such as Apple's Safari®, Google Android™ mobile web browser, Microsoft Internet Explorer® for Mobile, Opera Mobile™, that may be implemented as a series of machine-readable instructions for receiving, interpreting, and displaying web page information from the server device 940 or other back-end components 904 while also receiving inputs from the vehicle operator. Another application of the plurality of applications may include an embedded web browser 1042 that may be implemented as a series of machine-readable instructions for receiving, interpreting, and displaying web page information from the server device 940 or other back-end components 904 within the client application 1032.

Another of the plurality of client applications 1030 or routines 1034 may include an accelerometer routine 1038 that determines the acceleration and direction of movements of the mobile computing device 910 and/or on-board computing device 914, which correlate to the acceleration and direction of the vehicle 908. The accelerometer routine may process data from the accelerometer array 1024 to determine one or more vectors describing the motion of the vehicle 908 for use with the client application 1032. In some embodiments where the accelerometer array 1024 has X-axis, Y-axis, and Z-axis accelerometers 1024$x,y,z$, the accelerometer routine 1038 may combine the data from each accelerometer 1024$x,y,z$ to establish the vectors describing the motion of the vehicle 908 as it moves through three dimensional space. In some embodiments, the accelerometer routine 1038 may use data pertaining to less than three axes.

Another routine in the plurality of applications 1030 or routines 1034 may include a vehicle velocity routine 1040 that coordinates with the GPS module 1006 to retrieve vehicle velocity and direction information for use with one or more of the plurality of applications, such as the client application 1032, or for use with other routines.

Yet another routine in the plurality of applications 1030 or routines 1034 may include an image capture routine that coordinates with the image capture modules 1018, 1022 to retrieve image data for use with one or more of the plurality of applications, such as the client application 1032, or for use with other routines.

Another routine in the plurality of applications 1030 or routines 1034 may include a position determination routine that coordinates with the spatial sensors disposed throughout the vehicle to determine the position of vehicle parts relative to the vehicle for use with one or more of the plurality of applications, such as the client application 1032, or for use with other routines.

The user or vehicle operator may also launch or instantiate any other suitable user interface application (e.g., the native web browser 1036, or any other one of the plurality of software applications 1030) to access the server device 940 to implement the vehicle treatment system 900. Additionally, the user or vehicle operator may launch the client application 1032 from the mobile computing device 910 and/or on-board computing device 914, to access the server device 940 to implement the vehicle treatment system 900.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Although the preceding text sets forth a detailed description of numerous different embodiments, it should be understood that the legal scope of the invention is defined by the words of the claims set forth at the end of this patent. The detailed description is to be construed as example only and does not describe every possible embodiment, as describing every possible embodiment would be impractical, if not impossible. One could implement numerous alternate embodiments, using either current technology or technology developed after the filing date of this patent, which would still fall within the scope of the claims.

It should be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

What is claimed:

1. A method for categorizing vehicle treatment facilities into treatment complexity levels, the method executed by one or more processors programmed to perform the method, the method comprising:

receiving, at the one or more processors, impact characteristics for a damaged vehicle based on: vehicle part position data from spatial sensors disposed within the damaged vehicle, vehicle image data from an image capturing device disposed within the damaged vehicle, vehicle acceleration data from an accelerometer disposed within the damaged vehicle, and vehicle velocity data from a positioning device disposed within the damaged vehicle;

generating, by one or more processors, a plurality of treatment complexity levels, each of the plurality of treatment complexity levels representing a different degree of difficulty associated with treating damaged vehicles;

receiving, at the one or more processors, a plurality of indications of treatment facilities;

assigning, by the one or more processors, each of the plurality of indications of treatment facilities to one of the plurality of treatment complexity levels;

for each of the plurality of treatment complexity levels, sorting, by the one or more processors, each of the plurality of indications of treatment facilities assigned to the respective treatment complexity level;

storing, by the one or more processors, the sorted indications of treatment facilities for selecting a treatment facility for treating a damaged vehicle;
determining, by the one or more processors, a treatment complexity level of the plurality of treatment complexity levels for treating the damaged vehicle based on the impact characteristics; and
selecting, by the one or more processors, the treatment facility for treating the damaged vehicle based on the sorted indications of treatment facilities corresponding to the determined treatment complexity level of the damaged vehicle.

2. The method of claim 1, wherein sorting each of the plurality of indications of treatment facilities based on the assigned treatment complexity level comprises:
for each of the plurality of treatment complexity levels, ranking, by the one or more processors, each of the plurality of indications of treatment facilities assigned to the treatment complexity level based on one or more treatment facility evaluation characteristics.

3. The method of claim 2, wherein ranking each of the plurality of indications of treatment facilities assigned to the complexity level comprises:
assigning, by the one or more processors, a score for each of the one or more treatment facility evaluation characteristics to each of the treatment facilities assigned to the complexity level;
aggregating, by the one or more processors, the assigned scores for each of the treatment facilities to determine an overall score for the treatment facility; and
ranking, by the one or more processors, each of the indications of treatment facilities assigned to the complexity level based on the overall score for the treatment facility.

4. The method of claim 3, wherein the one or more treatment facility evaluation characteristics includes at least one of: duration data for the treatment facility, a treatment facility quality rating, a treatment facility availability, a price schedule for treating damaged vehicles, treatment facility location data, or a quality rating for one or more suppliers used by the treatment facility.

5. The method of claim 3, further comprising:
transmitting, at the one or more processors, information associated with transporting the damaged vehicle to the selected treatment facility.

6. The method of claim 5, wherein selecting the treatment facility for treating the damaged vehicle comprises:
transmitting, by the one or more processors, to an owner of the damaged vehicle, a subset of treatment facilities assigned to the same complexity level as the determined complexity level for treating the damaged vehicle and ranked above a predetermined threshold ranking; and
receiving, at the one or more processors, a selection of one of the treatment facilities in the subset of treatment facilities.

7. The method of claim 1, wherein each of the plurality of indications of treatment facilities is assigned to one of the plurality of treatment complexity levels based on at least one of: a repair level capability of the treatment facility, or a work quality history of the treatment facility; and
wherein each of the plurality of treatment complexity levels includes a price schedule for treating the damaged vehicles, and a time duration for completing treatment of the damaged vehicles.

8. The method of claim 4, wherein assigning a score for the quality rating for the one or more suppliers comprises ranking, by the one or more processors, each of the one or more suppliers based on one or more supplier evaluation characteristics.

9. The method of claim 8, wherein ranking each of the one or more suppliers based on one or more supplier evaluation characteristics comprises:
assigning, by the one or more processors, a score for each of the one or more supplier evaluation characteristics to each of the one or more suppliers;
aggregating, by the one or more processors, the assigned scores for each of the one or more suppliers to determine an overall score for the supplier; and
ranking, by the one or more processors, each of the one or more suppliers based on the overall score for the supplier.

10. The method of claim 9, wherein the one or more supplier evaluation characteristics includes at least one of: duration data for the supplier, a quality rating of the parts received from the supplier, or a proximity of the supplier to the treatment facility that receives the parts from the supplier.

11. A system for categorizing vehicle treatment facilities into treatment complexity levels, the system comprising:
a communication network; and
one or more computing devices communicatively coupled to the communication network, each of the one or more computing devices having a memory and one or more processors and at least one of the computing devices configured to:
receive impact characteristics for a damaged vehicle based on: vehicle part position data from spatial sensors disposed within the damaged vehicle, vehicle image data from an image capturing device disposed within the damaged vehicle, vehicle acceleration data from an accelerometer disposed within the damaged vehicle, and vehicle velocity data from a positioning device disposed within the damaged vehicle,
generate a plurality of treatment complexity levels, each of the plurality of treatment complexity levels representing a different degree of difficulty associated with treating damaged vehicles,
receive a plurality of indications of treatment facilities via the communication network,
assign each of the plurality of indications of treatment facilities to one of the plurality of treatment complexity levels,
for each of the plurality of treatment complexity levels, sort each of the plurality of indications of treatment facilities assigned to the respective treatment complexity level,
store the sorted indications of treatment facilities for selecting a treatment facility for treating a damaged vehicle,
determine a treatment complexity level of the plurality of treatment complexity levels for treating the damaged vehicle based on the impact characteristics, and
select the treatment facility for treating the damaged vehicle based on the sorted indications of treatment facilities corresponding to the determined treatment complexity level of the damaged vehicle.

12. The system of claim 11, wherein to sort each of the plurality of indications of treatment facilities based on the assigned treatment complexity level, the at least one computing device is configured to:
for each of the plurality of treatment complexity levels, rank each of the plurality of indications of treatment facilities assigned to the treatment complexity level based on one or more treatment facility evaluation characteristics.

13. The system of claim 12, wherein to rank each of the plurality of indications of treatment facilities assigned to the complexity level, the at least one computing device is configured to:
assign a score for each of the one or more treatment facility evaluation characteristics to each of the treatment facilities assigned to the complexity level,
aggregate the assigned scores for each of the treatment facilities to determine an overall score for the treatment facility, and
rank each of the indications of treatment facilities assigned to the complexity level based on the overall score for the treatment facility.

14. The system of claim 13, wherein the one or more treatment facility evaluation characteristics includes at least one of: duration data for the treatment facility, a treatment facility quality rating, a treatment facility availability, a price schedule for treating damaged vehicles, treatment facility location data, or a quality rating for one or more suppliers used by the treatment facility.

15. The system of claim 13, wherein the at least one computing device is further configured to:
transmit information associated with transporting the damaged vehicle to the selected treatment facility.

16. The system of claim 15, wherein to select the treatment facility for treating the damaged vehicle, the at least one computing device is configured to:
transmit to an owner of the damaged vehicle, a subset of treatment facilities assigned to the same complexity level as the determined complexity level for treating the damaged vehicle and ranked above a predetermined threshold ranking, and
receive a selection of one of the treatment facilities in the subset of treatment facilities.

17. The system of claim 11, wherein each of the plurality of indications of treatment facilities is assigned to one of the plurality of treatment complexity levels based on at least one of: a repair level capability of the treatment facility, or a work quality history of the treatment facility, and
wherein each of the plurality of treatment complexity levels includes a price schedule for treating the damaged vehicles, and a time duration for completing treatment of the damaged vehicles.

18. The system of claim 14, wherein to assign a score for the quality rating for the one or more suppliers, the at least one computing device is configured to rank each of the one or more suppliers based on one or more supplier evaluation characteristics.

19. The system of claim 18, wherein to rank each of the one or more suppliers based on one or more supplier evaluation characteristics, the at least one computing device is configured to:
assign a score for each of the one or more supplier evaluation characteristics to each of the one or more suppliers,
aggregate the assigned scores for each of the one or more suppliers to determine an overall score for the supplier, and
rank each of the one or more suppliers based on the overall score for the supplier.

20. The system of claim 19, wherein the one or more supplier evaluation characteristics includes at least one of: duration data for the supplier, a quality rating of the parts received from the supplier, or a proximity of the supplier to the treatment facility that receives the parts from the supplier.

* * * * *